US011327050B2

(12) United States Patent
Yazzie et al.

(10) Patent No.: US 11,327,050 B2
(45) Date of Patent: May 10, 2022

(54) MECHANICAL FAILURE MONITORING, DETECTION, AND CLASSIFICATION IN ELECTRONIC ASSEMBLIES

(71) Applicant: Intel Corporation, Santa Clara, CA (US)

(72) Inventors: Kyle Yazzie, San Tan Valley, AZ (US); Rajesh Kumar Neerukatti, Tempe (AZ); Naga Sivakumar Yagnamurthy, Chandler (AZ); David C. McCoy, Phoenix (AZ); Pramod Malatkar, Chandler (AZ); Frank P. Prieto, Gilbert (AZ)

(73) Assignee: Intel Corporation, Santa Clara, CA (US)

( * ) Notice: Subject to any disclaimer, the term of this patent is extended or adjusted under 35 U.S.C. 154(b) by 911 days.

(21) Appl. No.: 15/900,668

(22) Filed: Feb. 20, 2018

(65) Prior Publication Data

US 2019/0257793 A1 Aug. 22, 2019

(51) Int. Cl.
*G01N 29/44* (2006.01)
*G01N 29/14* (2006.01)

(52) U.S. Cl.
CPC ......... *G01N 29/14* (2013.01); *G01N 29/4445* (2013.01); *G01N 2291/0258* (2013.01); *G01N 2291/0289* (2013.01); *G01N 2291/2697* (2013.01)

(58) Field of Classification Search
CPC ............... G01N 29/4445; G01N 29/14; G01N 2291/0289; G01N 2291/0258; G01N 2291/2697

USPC .......................................................... 73/587
See application file for complete search history.

(56) References Cited

U.S. PATENT DOCUMENTS

| 7,117,149 B1 * | 10/2006 | Zakarauskas | G10L 17/26 |
| | | | 704/233 |
| 9,281,339 B1 * | 3/2016 | Lin | H01L 23/5389 |
| 2005/0092089 A1 * | 5/2005 | Gilgunn | H01L 21/67259 |
| | | | 73/587 |

(Continued)

FOREIGN PATENT DOCUMENTS

| CN | 101424666 | * | 5/2009 | ............ G01M 99/00 |
| JP | 02010181203 | * | 8/2010 | ............ G01N 29/14 |

(Continued)

OTHER PUBLICATIONS

Chen, Pei-Chi, "Determination of Initial Crack Strength of Silicon Die Using Acoustic Emission Technique," Journal of Electronic Materials, vol. 44, No. 7, published May 12, 2015; 10 pages.

(Continued)

*Primary Examiner* — Jacques M Saint Surin
(74) *Attorney, Agent, or Firm* — Patent Capital Group

(57) ABSTRACT

Disclosed herein are systems and methods for mechanical failure monitoring, detection, and classification in electronic assemblies. In some embodiments, a mechanical monitoring apparatus may include: a fixture to receive an electronic assembly; an acoustic sensor; and a computing device communicatively coupled to the acoustic sensor, wherein the acoustic sensor is to detect an acoustic emission waveform generated by a mechanical failure of the electronic assembly during testing.

25 Claims, 13 Drawing Sheets

(56) References Cited

U.S. PATENT DOCUMENTS

| | | | | |
|---|---|---|---|---|
| 2008/0041159 A1* | 2/2008 | Koester | ............... | G01N 29/265 |
| | | | | 73/598 |
| 2010/0039128 A1* | 2/2010 | Nitsch | .................. | G01N 29/223 |
| | | | | 324/762.05 |
| 2011/0133747 A1* | 6/2011 | Nickel | ............... | G01R 31/2884 |
| | | | | 324/512 |
| 2011/0265573 A1* | 11/2011 | Grittke | ................... | G01N 29/14 |
| | | | | 73/645 |
| 2016/0282246 A1* | 9/2016 | Yang | ....................... | G01M 5/00 |

FOREIGN PATENT DOCUMENTS

| | | | | |
|---|---|---|---|---|
| JP | 2010223761 | * | 10/2010 | ............... G01N 3/00 |
| JP | 005105254 | * | 12/2012 | ............. G01N 29/14 |

OTHER PUBLICATIONS

Reuther, G.M., et al., "Acoustic Detection of Micro-cracks in Small Electronic Devices," Elsevier: Microelectronics Reliability, Jun. 30, 2014; 5 pages; www.elsevier.com/locate/microrel.

Yeo, Alfred, et al., "A Novel Damage Test Evaluation of IC Bond Pad Stack Strength," 2013 IEEE 15th Electronics Packaging Technology Conference (EPTC 2013), Dec. 11-13, Singapore; 43 pages.

* cited by examiner

MECHANICAL FAILURE MONITORING, DETECTION, AND CLASSIFICATION IN ELECTRONIC ASSEMBLIES

BACKGROUND

Electronic assemblies, such as integrated circuit (IC) packages, may be subject to mechanical stresses during manufacturing and/or use that may compromise their performance.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

DETAILED DESCRIPTION

Figure 1:
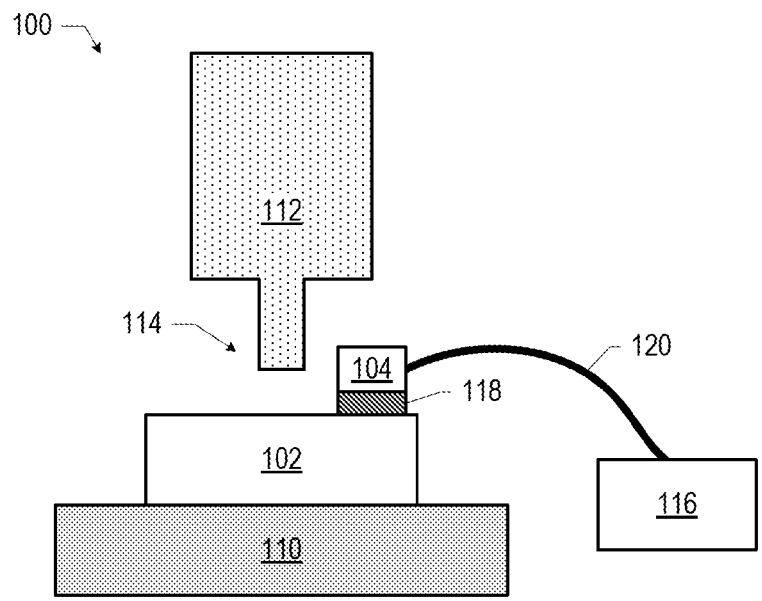
FIGS. 1-13 are various views of arrangements of mechanical monitoring apparatuses and electronic assemblies, in accordance with various embodiments.

Disclosed herein are systems and methods for mechanical failure monitoring, detection, and classification in electronic assemblies. In some embodiments, a mechanical monitoring apparatus may include: a fixture to receive an electronic assembly; an acoustic sensor; and a computing device communicatively coupled to the acoustic sensor, wherein the acoustic sensor is to detect an acoustic emission waveform generated by a mechanical failure of the electronic assembly during testing.

As the drive toward increasing miniaturization of electronics continues, electronics assemblies may include more functionality in thinner and smaller form factors. Small and thin components (such as thin integrated circuit (IC) packages), however, may be particularly vulnerable to mechanical stress (e.g., during assembly, during testing, or during attachment of a thermal management device), and may suffer mechanical failures during handling or use.

Some electronic components (e.g., dies) may utilize resistance measurements from a die monitoring circuit. An open in a die monitoring circuit may indicate the presence of a crack. The use of some such die monitoring circuits in a testing environment may utilize the manual soldering of leads to the die monitoring contacts, which may be time- and labor-intensive. Additionally, cracks that arise in the center of a die, cracks that arise on the backside of the die, or corner die chips may not be detected until the crack grows to reach the die monitoring circuit (if at all); consequently, die monitoring circuit-based failure detection techniques may not capture failures when they arise. Other failure analysis techniques, such as those that utilize microscopy (e.g., scanning acoustic microscopy or infrared laser confocal microscopy), may only be applied after a failure has occurred (or is suspected), and are also time- and labor-intensive.

The systems and methods disclosed herein may be used to detect and/or characterize mechanical failures in an electronic assembly with greater accuracy and efficiency than conventional techniques. Further, the systems and methods disclosed herein may do so in conditions that realistically represent the environment in which these assemblies are used. In some embodiments, the systems and methods disclosed herein may be used to detect internal die cracks or through die cracks in dies that are included in IC packages. In some embodiments, the systems and methods disclosed herein may be used to detect die cracks and dies that are included in IC packages and also mounted to a circuit board (e.g., a motherboard). In some embodiments, the systems and methods disclosed herein may be used to detect mechanical failures in other components of an IC package or other electronic assembly, such as a package substrate (e.g., an organic substrate), an underfill material, solder joints, or an overmold material (e.g., an epoxy mold compound used for encapsulation), among others. The in-situ failure detection systems and techniques disclosed herein are not limited to testing apparatuses used in a laboratory, but may additionally or alternatively be utilized in factory assembly tooling. In some such embodiments, a factory assembly tool may test a unit and stop a process when a die crack or other mechanical failure is detected, thereby reducing the waste caused by building more units with an unsatisfactory process and allowing the tool owner to identify and resolve the issue causing the mechanical failure (and consequently, improving yield). Many other embodiments are disclosed herein.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The drawings are not necessarily to scale. Although many of the drawings illustrate rectilinear structures with flat walls and right-angle corners, this is simply for ease of illustration, and actual devices made using these techniques will exhibit rounded corners, surface roughness, and other features. As used herein, a "mechanical monitoring apparatus" may be an apparatus that monitors mechanical properties of an electronic assembly, and may also perform additional functions (or may not perform additional functions). For example, a pick-and-place machine that monitors mechanical properties during picking or placement may be a mechanical monitoring apparatus.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. As used herein, a "package" and an "IC package" are synonymous. As used herein, an "electronic assembly" may refer to any multi-component electronic apparatus. Examples of electronic assemblies may include dies secured to package substrates (e.g., as discussed below with reference to FIG. 29), or electronic components secured to an interposer or a circuit board (e.g., as discussed below with reference to FIG. 30). When used to describe a range of dimensions, the phrase "between X and Y" represents a range that includes X and Y.

FIG. 1 is a side cross-sectional view of an arrangement of a mechanical monitoring apparatus 100 and an electronic assembly 102. The mechanical monitoring apparatus 100 of FIG. 1 may include a fixture 110 that may support the electronic assembly 102. In some embodiments, the fixture 110 may include recesses, clamps, bumpers, an adhesive, or other mechanical components (not shown in FIG. 1) to secure the electronic assembly 102 in a desired position; in other embodiments, the fixture 110 may not include any such features (and may instead be, for example, a flat surface on which the electronic assembly 102 may rest). In some embodiments, the fixture 110 may be translatable in one or more directions and/or rotatable to achieve a desired alignment between the actuator 112 and the electronic assembly 102 supported on the fixture 110.

The mechanical monitoring apparatus 100 of FIG. 1 may include an actuator 112. The actuator 112 may be a device configured to controllably apply a force to the electronic assembly 102 at a contact surface 114 of the actuator 112, and may include a motor, a hydraulic system, or a pneumatic system, for example. In FIG. 1, the actuator 112 may be an indenter; in use, the contact surface 114 of the actuator 112 may apply a "downward" force to the electronic assembly 102 (supported by the fixture 110). Depending upon the geometry of the fixture 110, the force applied by the actuator 112 on the electronic assembly 102 may be a compressive force (e.g., when the fixture 110 support the electronic assembly 102 below the contact surface 114) or a bending force (e.g., when the fixture 110 does not support the electronic assembly 102 below the contact surface 114), for example. The contact surface 114 of the actuator 112 may have any suitable shape for applying a desired force profile to the electronic assembly 102. For example, in some embodiments, the contact surface 114 may be a flat tip (e.g., to mimic the attachment of a thermal management device), a line tip (e.g., made with a steel rod to mimic a concentrated loading), or a spherical tip (e.g., to mimic loading by a particle or foreign material). In some embodiments, the actuator 112 may be translatable in one or more directions and/or rotatable to achieve a desired alignment between the actuator 112 and the electronic assembly 102 supported on the fixture 110.

The mechanical monitoring apparatus 100 of FIG. 1 may also include an acoustic sensor 104. The acoustic sensor 104 may detect acoustic emission (AE) waves of elastic energy generated by the sudden release of stored strain energy in the electronic assembly 102 when the electronic assembly 102 undergoes a mechanical failure. In the mechanical monitoring apparatus 100 of FIG. 1, a mechanical failure of the electronic assembly 102 may be caused by the force applied by the contact surface 114 of the actuator 112 to the electronic assembly 102. Mechanical failures that may result in the emission of AE waves include cracks, chips, collapses, or delamination, among others. In some embodiments, a mechanical failure detected by the apparatuses and techniques disclosed herein may be a die crack, such as an internal die crack (i.e., a die crack that is not apparent from a visual inspection of the top, exposed side of the die). The acoustic sensor 104 may also detect AE waves generated by the mechanical monitoring apparatus 100 that are not representative of mechanical failures of the electronic assembly 102. For example, the acoustic sensor 104 may detect AE waves generated by mechanical vibration of the actuator 112. Although a single acoustic sensor 104 is depicted in many of the accompanying figures, a mechanical monitoring apparatus 100 may include one or more acoustic sensors 104. Examples of arrangements including multiple acoustic sensors 104, and monitoring techniques that may utilize the data from multiple acoustic sensors 104, are discussed below with reference to FIGS. 16 and 17.

Any suitable acoustic sensors 104 may be used. In some embodiments, an acoustic sensor 104 may include a piezoelectric crystal enclosed in a casing; elastic waves generated by a mechanical failure may cause strain and the piezoelectric crystal to be converted to a detectable voltage. Any other suitable acoustic sensor 104 may be used. Relative to die monitoring circuit-based approaches, using an acoustic sensor 104 to detect mechanical failures may avoid manual soldering for each test, resulting in a more ergonomically friendly procedure.

In FIG. 1, the acoustic sensor 104 is depicted as coupled to the electronic assembly 102 by an attachment medium 118. In some embodiments, the attachment medium 118 may be a non-rigid medium, such as an elastomeric adhesive (e.g., honey or vacuum grease) or an adhesive foam. Use of a viscous or otherwise non-rigid attachment medium 118 may advantageously allow longitudinal waves to transmit to the acoustic sensor 104. In some embodiments, the attachment medium 118 may be readily removable to allow the acoustic sensor 104 to be quickly coupled to, and decoupled from, the electronic assembly 102. For example, the attachment medium 118 may be a readily removable or washable adhesive, a removable tape, or a magnet that readily couples and decouples to a magnetic portion of the electronic assembly 102. In some embodiments, the attachment medium 118 may be a rigid medium, such as a rigid adhesive or a screw or other fastener. In some embodiments, the attachment medium 118 may permanently couple the acoustic sensor 104 to the underlying component, which may be particularly useful when the acoustic sensor 104 is coupled to a portion of the mechanical monitoring apparatus 100 (as discussed below with reference to FIGS. 2-3. Although the attachment medium 118 is illustrated in the accompanying figures as being disposed between the acoustic sensor 104 and the electronic assembly 102, this need not be the case. For example, in some embodiments, the attachment medium 118 may be a plate or other housing that rests "on top" of the acoustic sensor 104 and is secured to the electronic assembly 102 at one or more points around the acoustic sensor 104.

The acoustic sensor 104 may be coupled to a computing device 116. Various ones of the accompanying figures illustrate the acoustic sensor 104 coupled to the computing device 116 by a cable 120 (over which electrical or optical signals may flow), but in other embodiments, the acoustic sensor 104 may communicate wirelessly with the computing device 116. The computing device 116 may receive the signals generated by the acoustic sensor 104 and may process these signals to perform any of the mechanical failure monitoring, detection, and classification techniques disclosed herein. In particular, the computing device 116 may process AE waveforms generated by mechanical failures of electronic assemblies 102 to detect and/or characterize these mechanical failures. Although the computing device 116 is shown as a single element in FIG. 1 (and others of the accompanying figures), this is simply for ease of illustration, and the computing device 116 may include one or more computing devices of any suitable form (such as any of the computing devices discussed below with reference to FIG. 31). In some embodiments, the computing device 116 may include a display that outputs information about the AE wave detected by the acoustic sensor 104 to a human operator.

In some embodiments, the computing device 116 may be, or may be communicatively coupled to, a computing device that controls the operation of the actuator 112 and/or the fixture 110. Thus, in some embodiments, the computing device 116 may, upon detection of a mechanical failure in the electronic assembly 102 by use of data generated by the acoustic sensor 104, cause the actuator 112 to stop applying force to the electronic assembly 102 or to otherwise change the interaction between the actuator 112 and the electronic assembly 102. In some embodiments, an operator may program the computing device 116 to achieve a desired position of the actuator 112 and/or the fixture 110. In some embodiments, an operator may program the computing device 116 to achieve a desired behavior of the actuator 112 (e.g., a cyclic loading program as discussed below with reference to FIGS. 25 and 26).

A mechanical monitoring apparatus 100 may include components other than those illustrated in the accompanying figures. For example, a mechanical monitoring apparatus 100 may include a load cell to monitor applied force, pressure paper to check alignment, and/or other suitable components.

Figure 2:
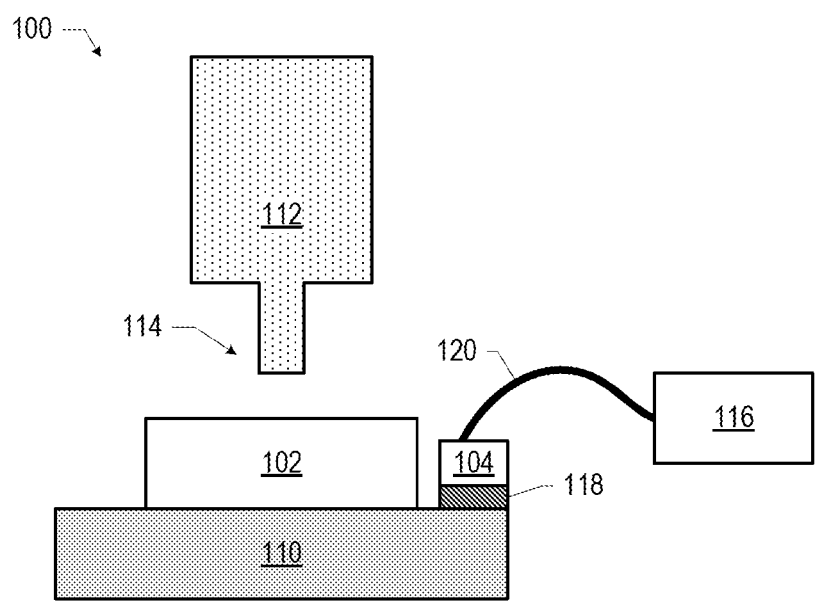
Figure 3:
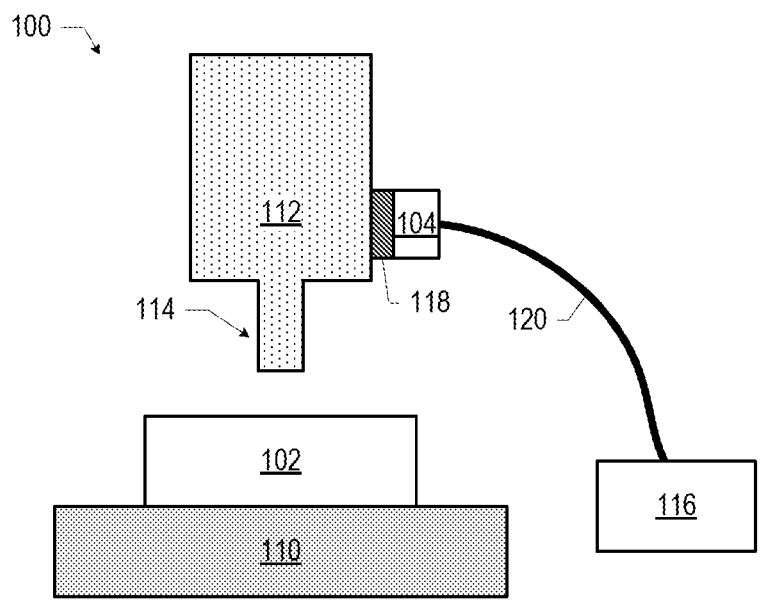
Figure 5:
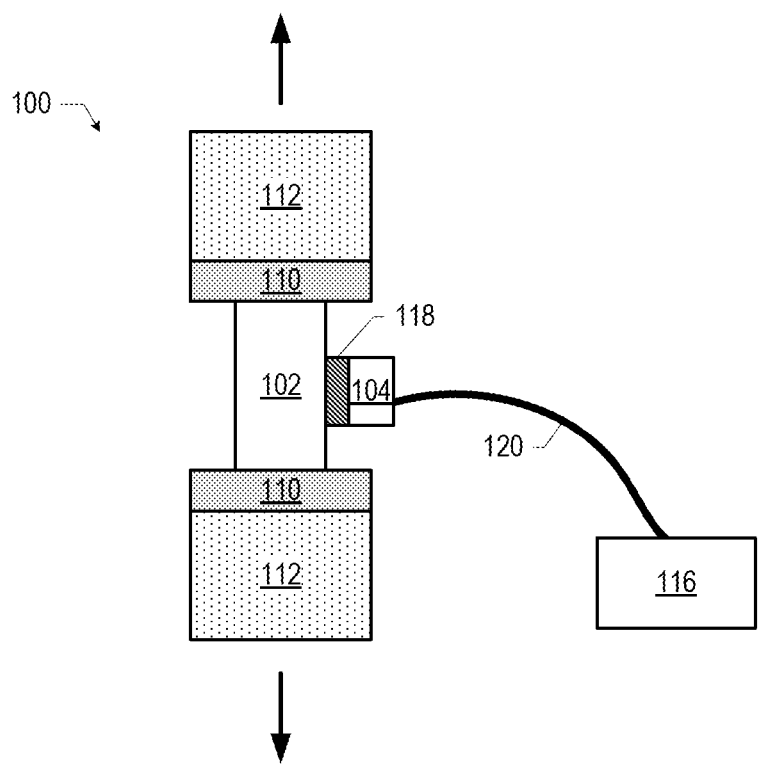

FIGS. 2-13 illustrate additional examples of arrangements of mechanical monitoring apparatuses 100 and electronic assemblies 102. Any of the features discussed with reference to any of the mechanical monitoring apparatuses 100 of FIGS. 1-13 herein may be combined with any other suitable features to form a mechanical monitoring apparatus 100. For example, as discussed further below, FIG. 3 illustrates an embodiment in which an acoustic sensor 104 is coupled to an indenter-type actuator 112, and FIG. 5 illustrates an embodiment in which an acoustic sensor 104 is coupled to the electronic assembly 102 in a tensile tester-type actuator 112. Various features of FIGS. 2 and 5 may be combined so that a mechanical monitoring apparatus 100, in accordance with the present disclosure, includes a tensile tester-type actuator 112 with an acoustic sensor 104 coupled to the tensile tester-type actuator 112. This particular combination is simply an example, and any combination may be used. A number of elements of FIG. 1 are shared with FIGS. 2-13; for ease of discussion, a description of these elements is not repeated, and these elements may take the form of any of the embodiments disclosed herein.

The acoustic sensor 104 in a mechanical monitoring apparatus 100 may not be coupled to the electronic assembly 102, but may instead be coupled to portions of the mechanical monitoring apparatus 100 and may still detect AE waves generated by a mechanical failure of the electronic assembly 102 (as these waves travel through the mechanical monitoring apparatus 100). For example, FIG. 2 illustrates an embodiment in which the acoustic sensor 104 is coupled to the fixture 110 via the attachment medium 118. Having the acoustic sensor 104 coupled to the fixture 110 may reduce the frequency at which the acoustic sensor 104 is removed and reattached when multiple electronic assemblies 102 are being tested, relative to the embodiment of FIG. 1.

FIG. 3 illustrates an embodiment in which the acoustic sensor 104 is coupled to the actuator 112 via the attachment medium 118. As discussed above with reference to FIG. 2, having the acoustic sensor 104 coupled to the actuator 112 may reduce the frequency at which the acoustic sensor 104 is removed and reattached when multiple electronic assemblies 102 are being tested, relative to the embodiment of FIG. 1. The acoustic noise generated by the actuator 112 may be more strongly represented in the signals generated by the acoustic sensor 104 and the arrangement of FIG. 3, relative to the arrangements of FIGS. 1 and 2, but the machine learning techniques disclosed herein (or other filtering or signal processing techniques, as appropriate) may be used to distinguish this actuator noise from the AE signals of interest.

Figure 4:
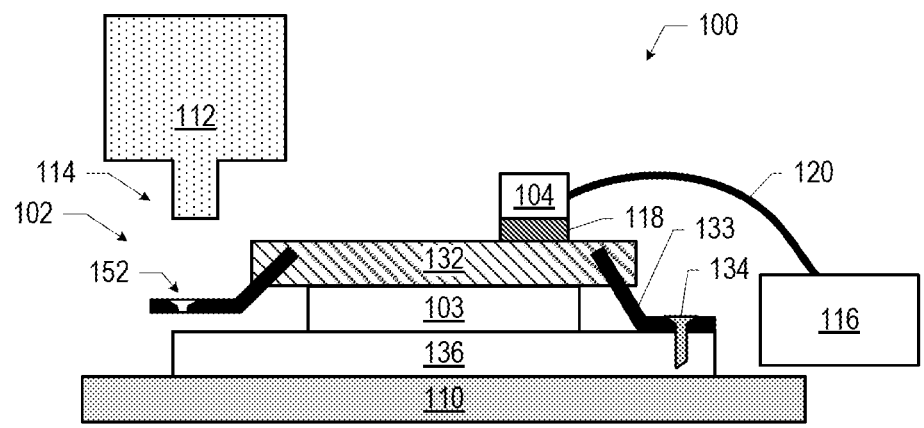

As noted above, an indenter-type actuator 112 may be used to perform compressive testing or bend testing, depending upon the arrangement of the actuator 112, the fixture 110, and the electronic assembly 102. For example, FIG. 4 is a side, cross-sectional view of an arrangement of a mechanical monitoring apparatus 100 and an electronic assembly 102 that includes a circuit board 136, an IC package 103, and a thermal management device 132. The circuit board 136 may be formed using printed circuit board (PCB) techniques, and may be, for example, a motherboard. The IC package 103 may take the form of any of the IC packages disclosed herein (e.g., discussed below with reference to FIG. 7, FIG. 9, FIG. 12, FIG. 13, or FIG. 29). In some embodiments, the IC package 103 may be a bare die, such as any of the dies disclosed herein. The thermal management device 132 may be formed of a material or materials that have a higher thermal conductivity than the IC package 103, and may serve to draw heat away from the IC package 103 during operation of the IC package 103. For example, the thermal management device 132 may be an integrated heat spreader or a heat sink.

In the electronic assembly 102 of FIG. 4, the thermal management device 132 may include leaf springs 133 at its corners; these leaf springs 133 may be secured to the circuit board 136 by screws 134 extending through holes 152 in the leaf springs 133. During manufacturing of the electronic assembly 102, the IC package 103 may be coupled to the circuit board 136 (e.g., by solder, not shown), the thermal management device 132 may be positioned on the IC package 103, and the screws 134 may be manually inserted in the holes 152 in the leaf springs 133 and driven to couple the thermal management device 132 to the circuit board 136, sandwiching the IC package 103. This process may result in an uneven, bending pressure applied to the IC package 103 (and to the thermal management device 132 and the circuit board 136) as different ones of the screws 134 in different ones of the leaf springs 133 are driven into the electronic assembly 102. In the IC package 103, the pressure may be greatest at its corners, which may lead to cracking of the internal die. FIG. 4 illustrates a testing arrangement in which not all of the screws 134 have been driven into the electronic assembly 102, and the actuator 112 is aligned to apply a force over the remaining open hole 152 to simulate the process of driving in the last screw 134. The acoustic sensor 104 (shown in FIG. 4 as being coupled to the thermal management device 132, but which may be coupled to any suitable portion of the mechanical monitoring apparatus 100) may detect an AE wave generated by a mechanical failure of the electronic assembly 102 (e.g., the IC package 103, the circuit board 136, or the thermal management device 132) while the actuator 112 applies force to the thermal management device 132. Use of the arrangement of FIG. 4 to test an electronic assembly 102 may be easier, more accurate, and less ergonomically stressful than attempting to re-create this failure mode with human operators.

In some embodiments, an arrangement like that of FIG. 4 may be used to monitor for mechanical failures during the fastening of the thermal management device 132 to the circuit board 136 by a torque screw driver actuator 112; a support vector machine learning technique may be used (e.g., along with the other machine learning techniques disclosed herein) to distinguish the AE wave generated by a mechanical failure of the electronic assembly 102 from the mechanical vibration (e.g., the "click" generated when the torque screw driver reaches its maximum torque) of the actuator 112. Utilizing a machine learning technique to distinguish an AE wave generated by a mechanical failure from other acoustic noise may be advantageous over conventional filtering techniques, particularly when the frequency content of the mechanical failure AE wave overlaps with the frequency content of the other acoustic noise.

FIGS. 1-3 illustrate indenter-type actuators 112, but a mechanical monitoring apparatus 100 in accordance with the present disclosure may include any suitable actuator 112. For example, FIG. 5 illustrates a tensile tester-type actuator 112 that may apply a tensile ("stretching") force to an electronic assembly 102. In the embodiment of FIG. 5, the fixture 110 may include clamps or other structures to hold the electronic assembly 102 at opposite sides while the actuator 112 pulled the sides in opposite directions to apply a tensile force to the electronic assembly 102. Tensile testing may be particularly valuable for electronic assemblies 102 that include flexible components, such as circuitry and wiring embedded in an elastomeric material (e.g., for use as a wearable device). As noted above, FIG. 5 illustrates the acoustic sensor 104 coupled to the electronic assembly 102, but the acoustic sensor 104 may be coupled to any suitable portion of the mechanical monitoring apparatus 100.

Figure 6:
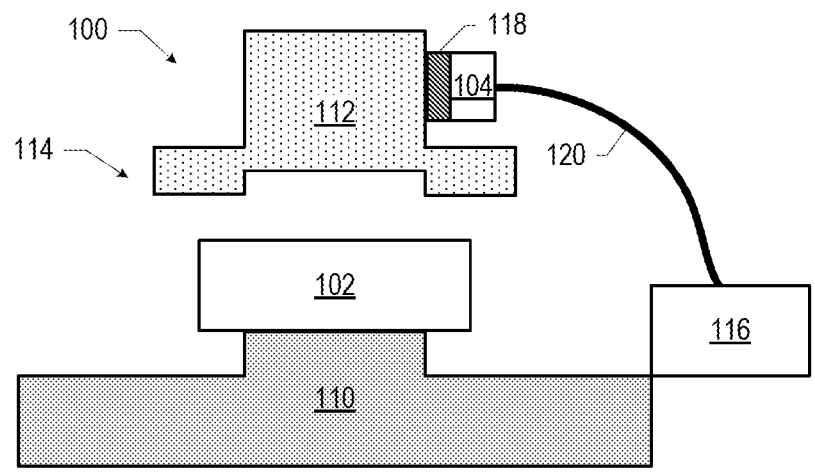

FIGS. 6-9 illustrate mechanical monitoring apparatuses 100 that include bend tester-type actuators 112. For example, FIG. 6 illustrates an edge loader-type actuator 112 that has a contact surface 114 arranged to press "downward" on the perimeter of an electronic assembly 102 while the middle of the electronic assembly 102 is supported by a fixture 110, as shown. FIG. 6 illustrates an acoustic sensor 104 coupled to the actuator 112, but the acoustic sensor 104 may be coupled to any suitable portion of the mechanical monitoring apparatus 100 or the electronic assembly 102.

Figure 7:
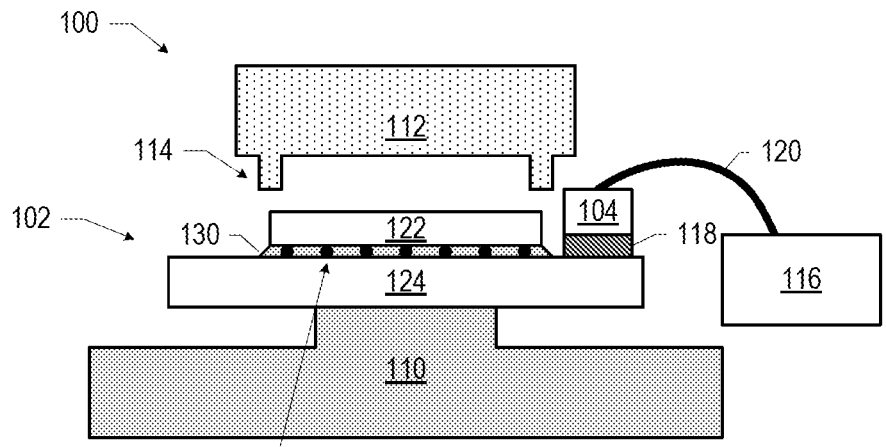

FIG. 7 illustrates a particular embodiment of an arrangement including an edge loader-type actuator 112 like the actuator 112 discussed above with reference to FIG. 6. In FIG. 7, the electronic assembly 102 is an IC package including a die 122 coupled to a package substrate 124 by first-level interconnects 125 (e.g., solder balls). The die 122, the package substrate 124, and the first-level interconnects 125 may take the form of any of the embodiments of these elements disclosed herein. An underfill material 130 may be disposed between the die 122 and the package substrate 124, and around the first-level interconnects 125. In some embodiments, the underfill material 130 may be an epoxy material (e.g., an epoxy fillet). The mechanical monitoring apparatus 100 of FIG. 7 may include a bend tester-type actuator 112 and a fixture 110 that, when in use, may apply a bending force to the perimeter of the die 122; such a force may cause particular stress in the underfill 130, and the mechanical failure of the electronic assembly 102 of FIG. 7 may be a crack or other failure in the underfill 130. Thus, the arrangement of FIG. 7 may be particularly valuable for testing the mechanical integrity of the underfill 130. FIG. 7 illustrates an acoustic sensor 104 coupled to the package substrate 124 of the electronic assembly 102, but the acoustic sensor 104 may be coupled any suitable portion of the electronic assembly 102 or the mechanical monitoring apparatus 100.

Figure 8:
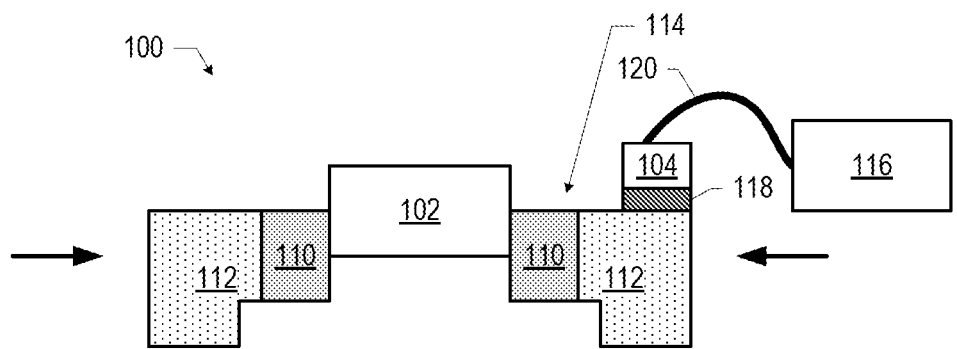

FIG. 8 illustrates a bend tester-type actuator 112 that may apply an offset compressive force to an electronic assembly 102 to reduce bending forces and the electronic assembly 102. In the embodiment of FIG. 8, the fixture 110 may include clamps or other structures to hold the electronic assembly 102 at opposite sides while the actuator 112 pushes the sides toward each other to apply a bending force to the electronic assembly 102. FIG. 8 illustrates an acoustic sensor 104 coupled to the actuator 112, but the acoustic sensor 104 may be coupled to any suitable portion of the mechanical monitoring apparatus 100 or the electronic assembly 102.

Figure 9:
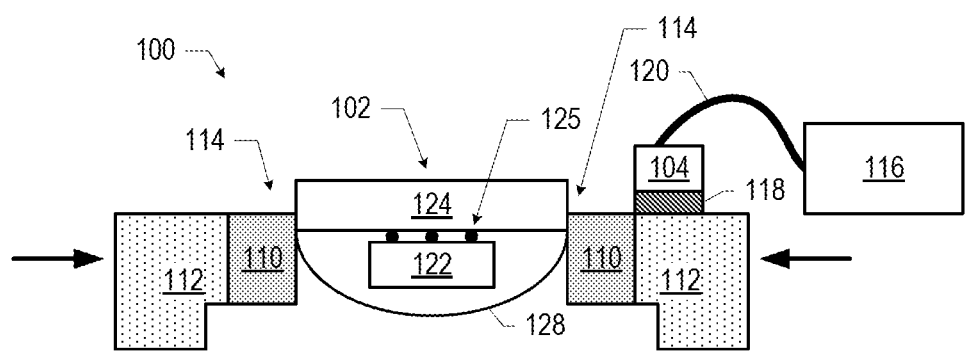

FIG. 9 illustrates a particular embodiment of an arrangement including a bend tester-type actuator 112 like the actuator 112 discussed above with reference to FIG. 8. In FIG. 9, the electronic assembly 102 is an IC package including a die 122 coupled to a package substrate 124 by first-level interconnects 125 (e.g., solder balls). The die 122, the package substrate 124, and the first-level interconnects 125 may take the form of any of the embodiments of the elements disclosed herein. An overmold material 128 may be disposed over the die 122 and the adjacent surface of the package substrate 124. In some embodiments, the overmold material 128 may be an epoxy material. In some embodiments, the overmold material 128 may also be present between the die 122 and the package substrate 124 so that the overmold material 128 also serves as an underfill. The mechanical monitoring apparatus 100 of FIG. 9 may include a bend tester-type actuator 112 and a fixture 110 that, when in use, may apply a bending force to the electronic assembly 102; such a force may cause particular stress in the overmold material 128, and the mechanical failure of the electronic assembly 102 of FIG. 9 may be a crack or other failure in the overmold material 128. The arrangement FIG. 9 may be particularly valuable for testing mechanical integrity of the overmold material 128. In some embodiments, the electronic assembly 102 of FIG. 9 may be a modem package. FIG. 9 illustrates an acoustic sensor 104 coupled to the actuator 112, but the acoustic sensor 104 may be coupled to any suitable portion of the mechanical monitoring apparatus 100 or the electronic assembly 102.

Figure 10:
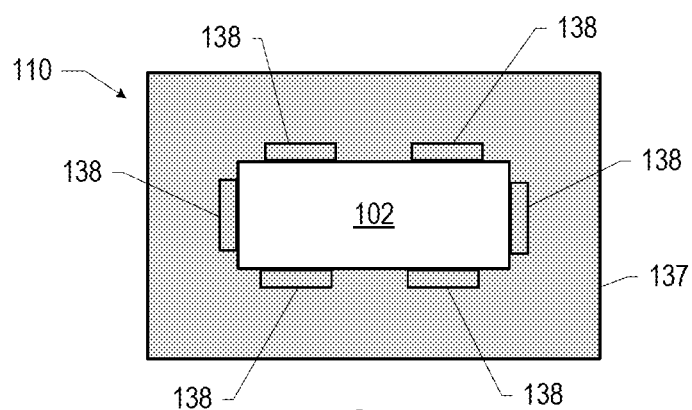

As noted above, a fixture 110 may include any suitable components to help secure the electronic assembly 102 in a desired position. For example, in some embodiments, the fixture 110 may include bumpers that may butt up against the edges of the electronic assembly 102 when the electronic assembly 102 is disposed on the fixture 110 to align the electronic assembly 102 laterally and limit lateral movement of the electronic assembly 102 during operation of the mechanical monitoring apparatus 100. In some embodiments, these bumpers may be magnetically coupled to an underlying stage so that the bumpers may be removed and repositioned as desired. For example, FIG. 10 is a top view of a fixture 110 including a stage 137 and multiple bumpers 138 disposed on and magnetically coupled to the stage 137. The bumpers 138 may be rectangular solids, and may be formed of a material that is magnetically attracted to the material of the stage 137. The strength of magnetic attraction between the bumpers 138 and the stage 137 may be selected so that the bumpers 138 remain in position as the electronic assembly 102 is positioned adjacent to the bumpers 138, and that the bumpers 138 may be manually removed by an operator and repositioned as desired. The use of magnetic bumpers 138 may also advantageously avoid expensive and complex machining of custom fixtures 110. Any suitable ones of the fixtures 110 disclosed herein may include a stage 137 and bumpers 138 (e.g., the fixtures 110 of any of FIGS. 1-4).

Figure 11:
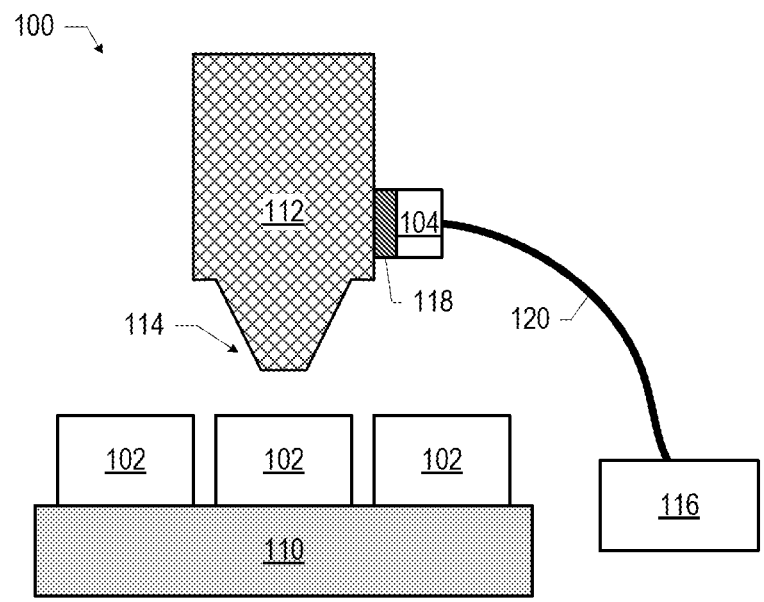

The mechanical monitoring arrangements 100 discussed above with reference to FIGS. 1-9 have been largely discussed with reference to the mechanical testing of electronic assemblies 102. However, these same arrangements may be used to monitor the mechanical condition of electronic assemblies 102 in contexts other than mechanical testing. For example, FIG. 11 illustrates a mechanical monitoring apparatus 100 in which the actuator 112 is a pick-and-place machine having a nozzle that provides the contact surface 114. The pick-and-place-type actuator 112 may, during operation, pick up and put down the electronic assemblies 102 (e.g., as part of a tape and reel die sort process). Any suitable pick-and-place machine may provide the actuator 112 of FIG. 11, and thus such machines are not discussed further herein. In the arrangement of FIG. 11, an acoustic sensor 104 may detect AE waves generated by an electronic assembly 102 when the forces applied by the actuator 112 during pick-and-place cause a mechanical failure in the electronic assembly 102. In some embodiments, the computing device 116 may be, or may be communicatively coupled to, a computing device that controls the operation of the actuator 112 of FIG. 11, and in some embodiments, the computing device 116 may change the behavior of the actuator 112 upon the detection of a mechanical failure in the electronic assembly 102. For example, in some embodiments, the computing device 116 may, upon detection of a mechanical failure in the electronic assembly 102 by use of data generated by the acoustic sensor 104, cause the pick-and-place actuator 112 to move the electronic assembly 102 to an area designated for electronic assemblies 102 that have suspected mechanical failures, while other electronic assemblies 102 are moved to a different area. In some embodiments, the force exerted by the pick-and-place actuator 112 on the electronic assemblies 102 may be adjusted as a function of the number and severity of mechanical failures detected during previous operation of the pick-and-place actuator 112; this adjustment may be automatic (e.g., under the control of the computing device 116 without operator intervention), or manual. FIG. 11 illustrates an acoustic sensor 104 coupled to the actuator 112, but the acoustic sensor 104 may be coupled any suitable portion of the mechanical monitoring apparatus 100 or the electronic assembly 102.

Figure 12:
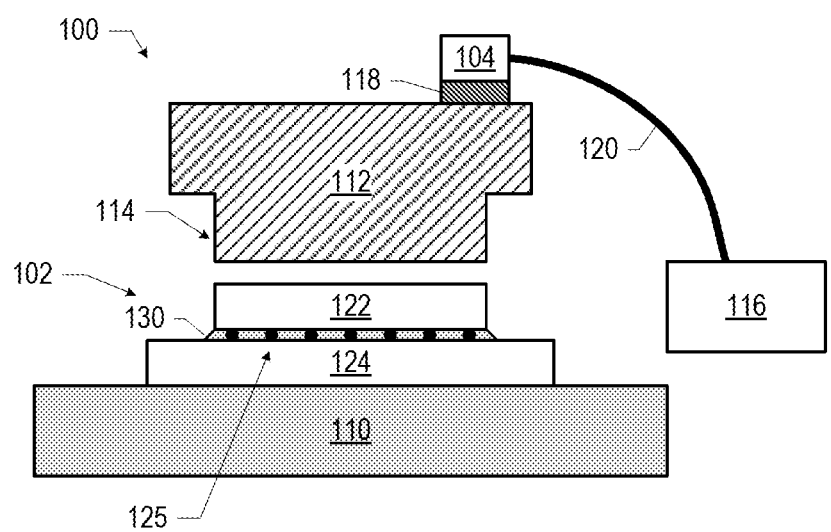

FIG. 12 illustrates a mechanical monitoring apparatus 100 in which the actuator 112 is a thermal head that generates heat at the contact surface 114. Such an arrangement may be used in a class test process in which the performance of electronic assemblies 102 under different conditions (e.g., heat) is tested so that the electronic assemblies 102 may be classified and separated ("binned") based on their performance. In the embodiment of FIG. 12, the electronic assembly 102 may include an IC package having a die 122 coupled to a package substrate 124 by first-level interconnects 125, in an underfill material 130 may be disposed between the die 122 and the package substrate 124 (e.g., in accordance with any of the embodiments of the IC package discussed above with reference to FIG. 7). During operation, the thermal head actuator 112 may be brought into contact with the die 122 (exerting a force on the top surface of the die 122) and a thermal head actuator 112 may generate heat (causing differential expansion of components of the electronic assembly 102 that have different coefficients of thermal expansion, and thus potentially causing mechanical failure in the electronic assembly 102). In the arrangement of FIG. 12, an acoustic sensor 104 may detect AE waves generated by the electronic assembly 102 when the forces generated in the electronic assembly 102 during operation of the thermal head actuator 112 cause mechanical failure in the electronic assembly 102. In some embodiments, the computing device 116 may be, or may be communicatively coupled to, the computing device that controls the operation of the actuator 112 of FIG. 12, and in some embodiments, the computing device 116 may change the behavior of the actuator 112 of FIG. 12 upon detection of a mechanical failure in the electronic assembly 102. For example, in some embodiments, the computing device 116 may, upon detection of a mechanical failure in the electronic assembly 102 by the use of data generated by the acoustic sensor 104, cause the thermal head actuator 112 to stop applying heat and/or pressure to the electronic assembly 102. In some embodiments, upon detection of a mechanical failure in the electronic assembly 102 by use of data generated by the acoustic sensor 104, the electronic assembly 102 may be marked as "failed" or otherwise separated for further testing. FIG. 12 illustrates an acoustic sensor 104 coupled to the actuator 112, but the acoustic sensor 104 may be coupled any suitable portion of the mechanical monitoring apparatus 100 or the electronic assembly 102.

Figure 13:
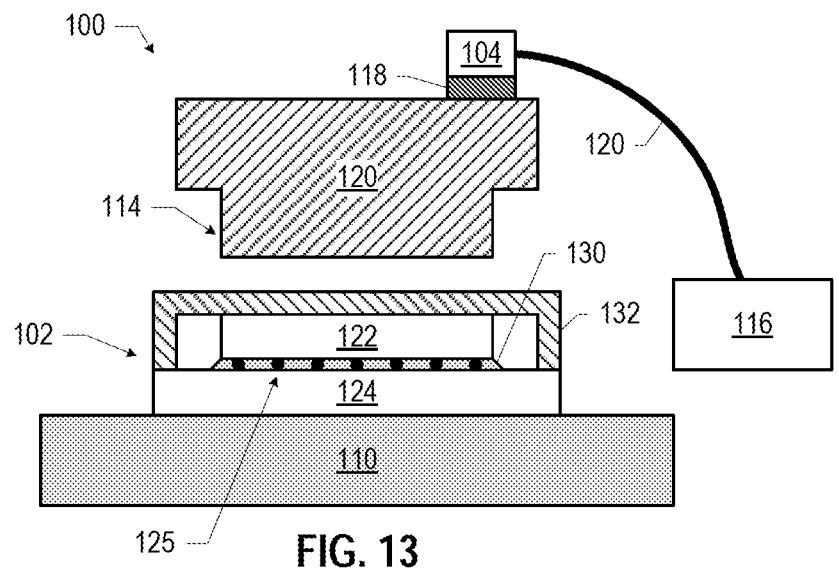

FIG. 13 illustrates another mechanical monitoring apparatus 100 in which the actuator 112 is a thermal head to generate heat of the contact surface 114. In the embodiment of FIG. 13, the electronic assembly 102 may include a die 122 coupled to a package substrate 124 by first-level interconnects 125, and a thermal management device 132 may contact the top surface of the die 122 and the exposed top surface of the package substrate 124. An arrangement like that depicted in FIG. 13 may be used to attach the thermal management device 132 to the rest of the electronic assembly 102, with the thermal head actuator 112 melting a sealant (not shown) between the thermal management device 132 and the package substrate 124. The elements of the electronic assembly 102 of FIG. 13 may take the form of any of the corresponding elements disclosed herein. During operation, the thermal head actuator 112 of FIG. 13 may be brought into contact with the thermal management device 132 (exerting a force on the top surface of the thermal management device 132 and the die 122) and the thermal head actuator 112 may generate heat. The contact force between the thermal head actuator 112 and the thermal management device 132 may result in pressure on the electronic assembly 102 (which may result in a mechanical failure).

In the arrangement of FIG. 13, an acoustic sensor 104 may detect AE waves generated by the electronic assembly 102 when the forces generated in the electronic assembly 102 during operation of the thermal head actuator 112 cause mechanical failure in the electronic assembly 102. In some embodiments, the computing device 116 may be, or may be communicatively coupled to, the computing device that controls the operation of the actuator 112 of FIG. 13, and in some embodiments, the computing device 116 may change the behavior of the actuator 112 of FIG. 13 upon detection of a mechanical failure in the electronic assembly 102. For example, in some embodiments, the computing device 116 may, upon detection of a mechanical failure in the electronic assembly 102 by the use of data generated by the acoustic sensor 104, cause the thermal head actuator 112 to stop applying heat and/or pressure to the electronic assembly 102. In some embodiments, upon detection of a mechanical failure in the electronic assembly 102 by use of data generated by the acoustic sensor 104, the electronic assembly 102 may be marked as "failed" or otherwise separated for further testing. FIG. 13 illustrates an acoustic sensor 104 coupled to the actuator 112, but the acoustic sensor 104 may be coupled any suitable portion of the mechanical monitoring apparatus 100 or the electronic assembly 102.

Figure 14:
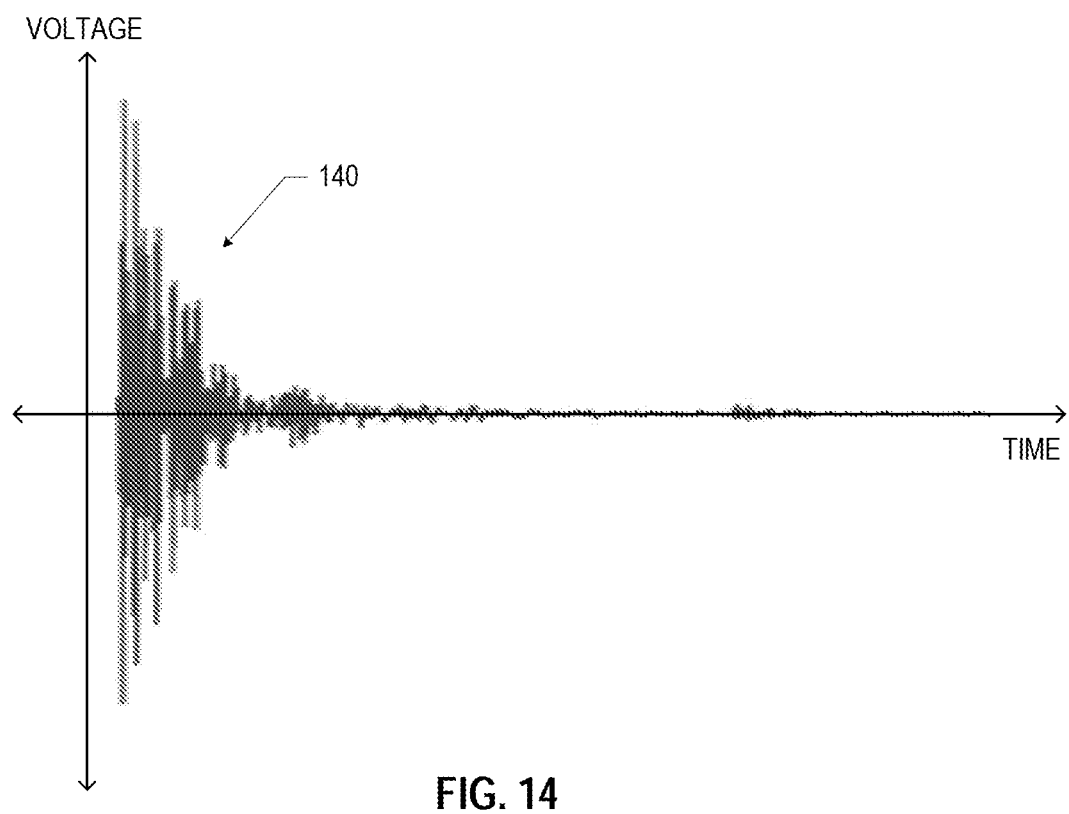
FIG. 14 is an example failure acoustic emission (AE) waveform, in accordance with various embodiments.

The AE wave generated by a mechanical failure in an electronic assembly 102 may appear as an AE waveform 140 in the data generated by an acoustic sensor 104. FIG. 14 is an example acoustic AE waveform that may be generated by a mechanical failure in an electronic assembly 102, in accordance with various embodiments. The computing device 116 (or another computing device between the acoustic sensor 104 and the computing device 116) may receive such an AE waveform 140 as an input, and may extract one or more features of the AE waveform 140 for further processing. Examples of such features include the initiation frequency of the AE waveform 140, the maximum amplitude of the AE waveform 140, the risetime of the AE waveform 140 (i.e., the time between the beginning of the AE waveform 140 and the maximum amplitude of the AE waveform 140), the energy of the AE waveform 140 (i.e., the area under the AE waveform 140), the counts of the AE waveform 140 (i.e., the number of peaks in the AE waveform 140), and the duration of the AE waveform 140 (i.e., the time between the beginning of the AE waveform 140 and the point at which the AE waveform 140 has a negligible magnitude). One or more of these features may be used to detect a mechanical failure and/or to estimate characteristics of the mechanical failure.

Figure 15:
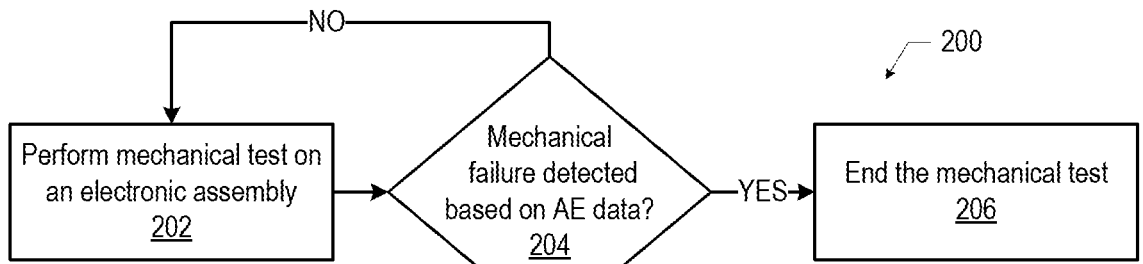
FIG. 15 is a flow diagram of a method of testing an electronic assembly, in accordance with various embodiments.

FIG. 15 is a flow diagram of a method 200 of testing an electronic assembly 102, in accordance with various embodiments. Although the operations of the method 200 may be illustrated with reference to particular embodiments of the mechanical monitoring apparatuses 100 and electronic assemblies 102 disclosed herein, the method 200 may be used by any suitable apparatus to test any suitable electronic assembly. Operations are illustrated once each and in a particular order in FIG. 15 (and others of the accompanying flow diagrams), but the operations may be reordered and/or repeated as desired (e.g., with different operations performed in parallel when monitoring multiple electronic assemblies 102 simultaneously). In some embodiments, the method 200 may be performed by the computing device 116 when the computing device 116 controls the operation of the actuator 112. In other embodiments, different computing devices may perform different ones of the operations of the method 200.

At 202, a mechanical test may be performed on an electronic assembly. For example, a mechanical monitoring apparatus 100 that includes an indenter-type actuator 112 (e.g., as discussed above with reference to FIGS. 1-4, a tensile tester-type actuator 112 (e.g., as discussed above with reference to FIG. 5), a bending-type actuator 112 (e.g., as discussed above with reference to FIGS. 6-9), or any other type of actuator 112 may apply mechanical force to an electronic assembly 102 (e.g., an IC package or other electronic assembly). The actuator 112 may be under the control of the computing device 116 or another computing device.

At 204, the AE data may be analyzed to determine whether a mechanical failure in the electronic assembly has been detected. For example, the computing device 116 (or another computing device) may analyze an AE waveform 140 (e.g., as illustrated in FIG. 14), or features derived from an AE waveform 140 (e.g., any of the features discussed above with reference to FIG. 14) to identify one or more characteristics of a mechanical failure of the electronic assembly 102. Determining whether a mechanical failure has been detected may be complicated by other acoustic noise generated during the mechanical test (e.g., acoustic noise generated by an actuator 112). Thus, in some embodiments, the determination of whether a mechanical failure has been detected may involve comparing one or more features derived from an AE waveform to one or more criteria (e.g., determined experimentally) that correlate with the failure mode of interest with adequately low variability. One technique for generating such criteria for a particular failure mode, may include generating AE feature data, determining the mean and standard deviation of each feature in the AE data (e.g., any of the features of the AE waveform 140 discussed herein), identifying the feature or features with the lowest standard deviation, and using the mean of each of those features as the criteria for the detection of a failure. Other techniques may be used to generate the criteria, as appropriate. In some embodiments, a mechanical failure may be detected when the maximum amplitude of an AE waveform 140 exceeds a predetermined threshold (e.g., 65 decibels for a die crack failure mode in an IC package). In other embodiments, other features of an AE waveform 140 (e.g., rise time or counts) may be compared to thresholds to determine whether a mechanical failure has occurred. In some embodiments, multiple features of an AE waveform 140 may be compared to criteria, and the results combined in an AND or OR fashion to determine whether a mechanical failure has occurred with a desired sensitivity.

If a mechanical failure is not detected at 204, the method 200 may continue to perform the mechanical test at 202. If a mechanical failure is detected at 204, the method 200 may proceed to 206, at which the mechanical test may end. In some embodiments, the computing device 116 may automatically cause an actuator 112 to stop applying mechanical stress to the electronic assembly 102 at 206 upon detection of a mechanical failure at 204.

Figure 16:
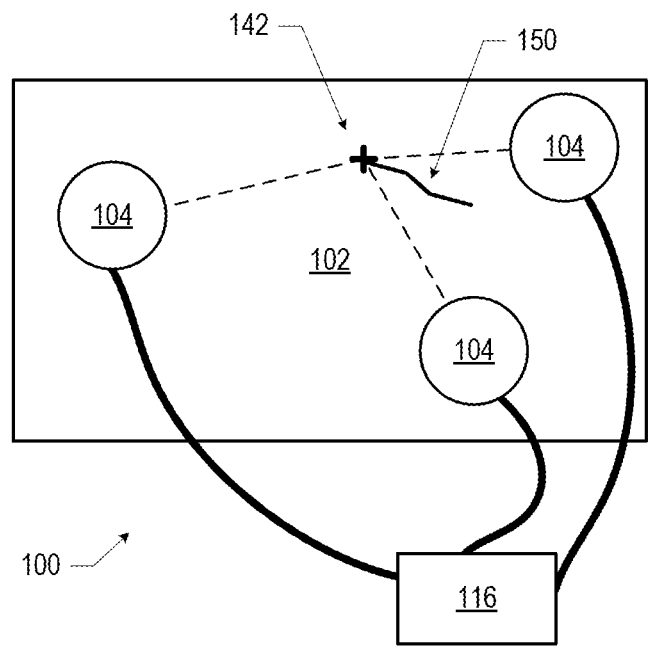
FIG. 16 illustrates an arrangement of multiple acoustic sensors that may be used to estimate a failure onset location, in accordance with various embodiments.
Figure 17:
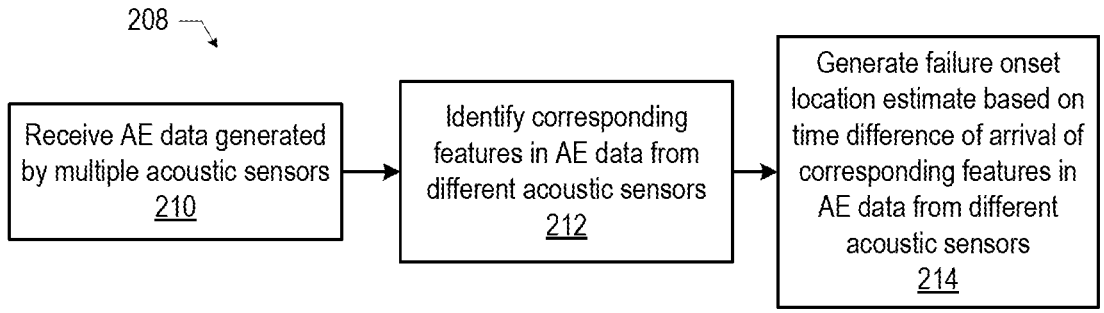
FIG. 17 is a flow diagram of a method of estimating a failure onset location, in accordance with various embodiments.

As noted above, in some embodiments, a mechanical monitoring apparatus 100 may include multiple acoustic sensors 104. In some embodiments, different ones of the acoustic sensors 104 may be positioned on different portions of the mechanical monitoring apparatus 100 and/or the electronic assembly 102. In some embodiments, these multiple acoustic sensors 104 may be used together to estimate the location at which a mechanical failure (e.g. a crack) originates using a time difference of arrival technique. For example, FIG. 16 illustrates an arrangement of multiple acoustic sensors 104 that may be used to estimate a failure onset location 142, in accordance with various embodiments. In particular, FIG. 16 illustrates an electronic assembly 102 in which a crack 150 has developed, starting from a failure onset location 142. In the arrangement of FIG. 16, three acoustic sensors 104 are positioned at different locations on the electronic assembly 102; in other embodiments, different ones of the acoustic sensors 104 may be positioned on the mechanical monitoring apparatus 100 instead of or in addition to on the electronic assembly 102. An AE wave generated by the formation of the crack 150 may originate at the failure onset location 142, and may travel to the acoustic sensors 104 at a speed dictated by the material composition of the intervening materials. Each of the acoustic sensors 104 may detect an AE waveform 140, and the computing device 116 may compare the AE waveforms 140 detected by the different acoustic sensors 104 to determine their relative position in time. For example, the acoustic sensor 104 that is closest to the failure onset location 142 may detect that peak of the AE waveform 140 sooner than an acoustic sensor 104 that is farther from the failure onset location 142. The difference in arrival time of the AE waveforms 140 (or features of the AE waveforms 140, such as the time of arrival of the peak) at the locations of the different acoustic sensors 104 may, in conjunction with the known locations of the acoustic sensors 104, be used to determine an approximate failure onset location 142, in accordance with any suitable time of arrival technique. Although FIG. 16 shows all of the acoustic sensors 104 as being located in a common lateral (e.g., x-y) plane, this need not be the case, and different acoustic sensors 104 may have different locations in the vertical direction (e.g., the z-direction), enabling the failure onset location 142 to be identified in this vertical direction as well. Such embodiments may be particularly useful for determining whether a detected failure originated in a die 122 or in a package substrate 124 (e.g., as shown in FIG. 13), FIG. 17 is a flow diagram of a method 208 of estimating a failure onset location 142, in accordance with various embodiments. Although the operations of the method 208 may be illustrated with reference to particular embodiments of the mechanical monitoring apparatuses 100 and electronic assemblies 102 disclosed herein, the method 208 may be used by any suitable apparatus to estimate a failure onset location 142 in any suitable electronic assembly. In some embodiments, the method 208 may be performed by the computing device 116, or by another computing device.

At 210, AE data may be received. This AE data may be generated by multiple acoustic sensors. For example, multiple acoustic sensors 104 may generate AE waveforms 140 (e.g., as illustrated in FIG. 14); these AE waveforms 140, or features derived from these AE waveforms 140 (e.g., any of the features discussed above with reference to FIG. 14), may be received at 210. In some embodiments, the computing device 116 may receive AE waveforms 140 from the acoustic sensors 104, while in other embodiments, the computing device 116 may receive features derived from these AE waveforms 140 by an intermediate computing device. The multiple acoustic sensors may be arranged in any desired manner (e.g., as illustrated in FIG. 16). For example, in some embodiments, one or more acoustic sensors 104 may be located on the electronic assembly 102, the actuator 112, the fixture 110, and/or in any suitable locations.

At 212, corresponding features may be identified in the AE data from different ones of the acoustic sensors. For example, the first peak of an AE waveform 140 in the AE data from different ones of the acoustic sensors 104 may be detected, and the times at which these first peaks occur may be identified. Use of the first peak for this purpose is only illustrative, and any suitable feature may be used.

At 214, a failure onset location may be estimated based on the time difference of arrival of the corresponding features in the AE data from the different acoustic sensors. For example, as discussed above with reference to FIG. 16, determining the time difference of arrival of the first peaks of the AE waveforms 140 at multiple different locations of the acoustic sensors 104 may allow the onset location 142 of a failure (e.g., the location at which a crack 150 originates) to be estimated. As discussed above, time difference of arrival techniques may utilize known information about the velocity of an AE waveform 140 in the electronic assembly 102, and the known relative locations of the acoustic sensors 104.

Figure 18:
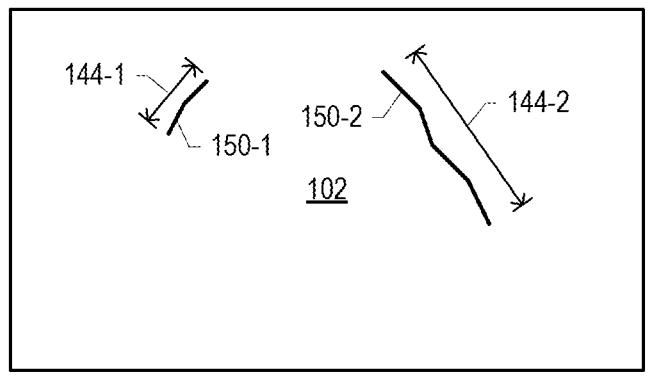
FIG. 18 illustrates multiple cracks of different lengths in an electronic assembly, in accordance with various embodiments.

AE data generated by acoustic sensors in a mechanical monitoring apparatus 100 may not only be used to detect the occurrence and onset location of a mechanical failure (as discussed above with reference to FIGS. 15-17), but may also be used to estimate various characteristics of mechanical failures. For example, in some embodiments, a mechanical monitoring apparatus 100 may be configured to estimate the length of a crack in an electronic assembly 102 based on AE data. FIG. 18 illustrates multiple cracks 150 of different lengths 144 in an electronic assembly 102, in accordance with various embodiments. The AE waves generated by the formation of each of these cracks 150 may differ in their features, and these differences may be used to estimate the length 144 of a crack 150. The length 144 of a crack 150 may indicate how quickly the cracks 150 were detected; shorter cracks 150 may be those caught closer to onset, and longer cracks 150 may be the result of overloading.

Figure 19:
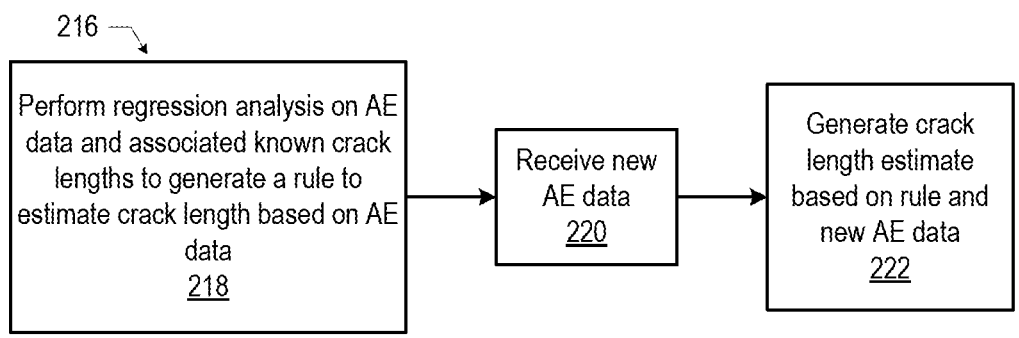
FIGS. 19 and 20 are flow diagrams of methods of generating a crack length estimate, in accordance with various embodiments.

FIG. 19 is a flow diagram of a method 216 of generating an estimate of the length 144 of the crack 150, in accordance with various embodiments. Although the operations of the method 216 may be illustrated with reference to particular embodiments of the mechanical monitoring apparatuses 100 and electronic assemblies 102 disclosed herein, the method 216 may be used by any suitable apparatus to estimate a crack length 144 in any suitable electronic assembly. In some embodiments, the method 216 may be performed by the computing device 116, or by another computing device.

At 218, a regression analysis may be performed on AE data and associated known crack lengths to generate a rule to estimate crack length based on AE data. For example, any suitable machine learning regression technique may be applied to a training set of data including AE waveforms 140 (or features derived from AE waveforms 140) associated with particular cracks 150, and the measured lengths 144 of those cracks 150. The machine learning regression technique may generate a rule into which an AE waveform 140

(or one or more features derived from an AE waveform 140) associated with a crack 150 may be input, and the rule may generate an estimate of the length 144 of that crack 150 based on the AE data. As known in the art of machine learning, the quality of the rule generated by a machine learning technique may depend on the quality of the training set of data, with larger and more representative training sets typically yielding improved rule quality. In some embodiments, the regression analysis may be a Gaussian regression analysis.

At 220, new AE data may be received. The new AE data may be associated with a crack; for example, the new AE data may include an AE waveform 140 triggered by a crack 150, or features derived from such an AE waveform 140.

At 222, an estimate of the length of the crack may be generated based on the rule (generated at 218) and the new AE data (received at 220). In particular, the new AE data may be input to the rule, and an estimate of the length 144 of the associated crack 150 may be output. In some embodiments, the estimate of the length of the crack generated at 222 may be accurate to within a few hundred microns (or a tighter tolerance) for cracks in the length range of 500 microns to 2500 microns.

Figure 20:
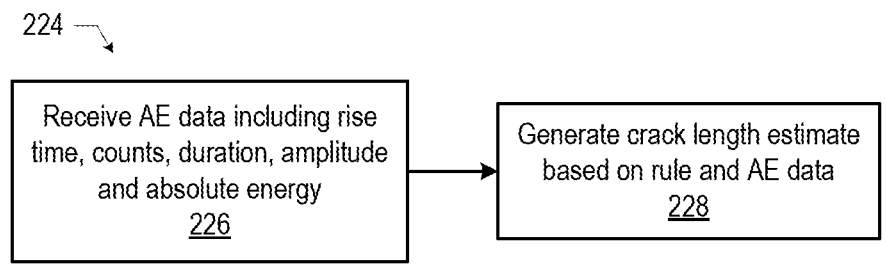

The method 216 includes generation of the crack length estimate rule (at 218); upon generation of the rule, the length 144 of new cracks 150 may be estimated using the rule (e.g., as discussed above with reference to 220 and 222. FIG. 20 is a flow diagram of a particular method 224 of generating an estimate of the length 144 of the crack 150 using an existing rule. The existing rule may be generated using a regression analysis, as discussed above with reference to 218, or any other suitable technique. In particular, the rule associated with the method 224 takes as an input AE data including risetime, counts, duration, amplitude, and absolute energy, and outputs an estimate of the length 144 of the associated crack 150. Although the operations of the method 224 may be illustrated with reference to particular embodiments of the mechanical monitoring apparatuses 100 and electronic assemblies 102 disclosed herein, the method 224 may be used by any suitable apparatus to estimate a crack length 144 in any suitable electronic assembly. In some embodiments, the method 224 may be performed by the computing device 116, or by another computing device.

At 226, AE data may be received. The AE data may include risetime, counts, duration, amplitude, and absolute energy of an AE waveform 140. In some embodiments, the AE data received at 226 may be the AE waveform 140 itself, while in other embodiments, the AE data received at 226 may include features of an AE waveform 140 previously derived from an AE waveform 140.

At 228, a crack length estimate may be generated based on the rule and the AE data received at 226. As noted above, the rule may take, as its input, the risetime, counts, duration, amplitude, and absolute energy, and may output an estimate of the length 144 of the crack 150 associated with the input AE data.

Figure 21:
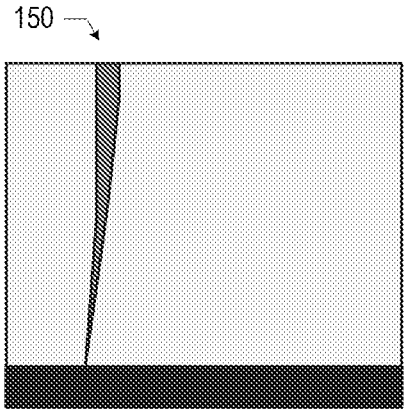
FIGS. 21 and 22 illustrate examples of different types of cracks, in accordance with various embodiments.
Figure 22:
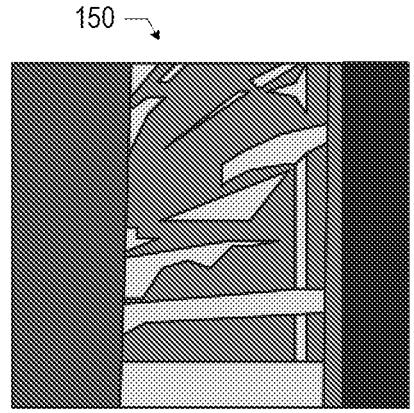

In some embodiments, the mechanical monitoring apparatus 100 may be configured to estimate the type of a crack 150 in an electronic assembly 102 based on AE data. As used herein, different "crack types" may each have their own set of physical characteristics that distinguish them. For example, FIGS. 21 and 22 illustrate examples of different types of cracks 150, in accordance with various embodiments; FIG. 21 depicts a linear crack 150, while FIG. 22 depicts a branched crack 150. Other crack types may be identified and distinguished in accordance with the techniques disclosed herein. Various ones of the techniques disclosed herein, using unsupervised machine learning approaches, do not require an a priori identification of which crack types are to be distinguished; instead, some machine learning techniques may automatically classify crack types by clustering, without a crack type being assigned in advance. Thus, the techniques disclosed herein may be used to generate a classification of crack types, and also to estimate the type of a particular crack after developing the classification. In some embodiments, the desired number of crack types may be specified to a machine learning technique; in other embodiments, the machine learning technique may automatically generate the number of crack types based on the AE data.

Figure 23:
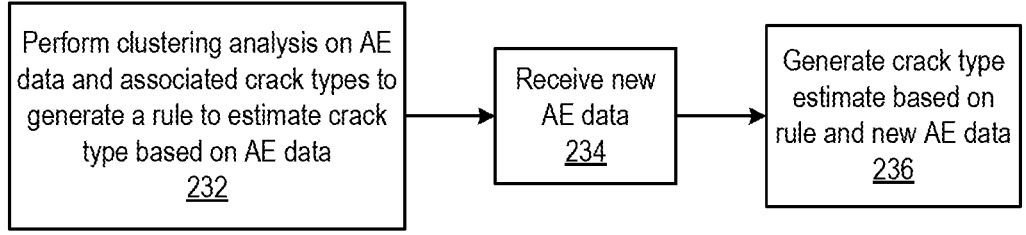
FIGS. 23 and 24 are flow diagrams of methods of generating a crack type estimate, in accordance with various embodiments.

FIG. 23 is a flow diagram of a method 230 of generating a crack type estimate, in accordance with various embodiments. Although the operations of the method 230 may be illustrated with reference to particular embodiments of the mechanical monitoring apparatuses 100 and electronic assemblies 102 disclosed herein, the method 230 may be used by any suitable apparatus to estimate a crack type in any suitable electronic assembly 102. In some embodiments, the method 230 may performed by the computing device 116, or by another computing device.

At 232, a clustering analysis may be performed on AE data and associated known crack types to generate a rule to estimate crack type based on AE data. For example, any suitable machine learning clustering technique (e.g., a k-means clustering technique) may be applied to a training set of data including AE waveforms 140 (or features derived from AE waveforms 140) associated with particular cracks 150. The clustering technique may generate a rule into which an AE waveform 140 (or one or more features derived from an AE waveform 140) associated with a crack 150 may be input, and the rule may generate an estimate of the type of that crack 150 based on the AE data.

At 234, new AE data may be received. The new AE data may be associated with a crack; for example, the new AE data may include an AE waveform 140 triggered by the crack 150, or features derived from such an AE waveform 140.

At 236, an estimate of the type of the crack may be generated based on the rule (generated at 232) and the new AE data (received at 234). In particular, the new AE data may be input to the rule, and an estimate of the type (e.g., linear or branched) of the associated crack 150 may be output.

Figure 24:
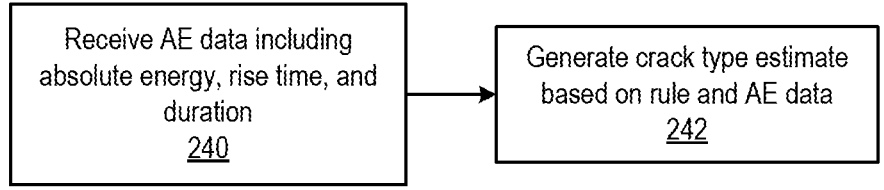

The method 230 includes generation of the crack type estimate rule (at 232); upon generation of the rule, the type of new cracks 150 may be estimated using the rule (e.g., as discussed above with reference to 234 and 236). FIG. 24 is a flow diagram of a particular method 238 of generating a crack type estimate using an existing rule. The existing rule may be generated using a clustering analysis, as discussed above with reference to 232, or any other suitable technique. In particular, the rule associated with the method 238 takes as an input AE data including absolute energy, risetime, and duration, and outputs an estimate of the type of the associated crack 150. Although the operations of the method 238 may be illustrated with reference to particular embodiments of the mechanical monitoring apparatuses 100 and electronic assemblies 102 disclosed herein, the method 230 may be used in any suitable apparatus to estimate a crack type in any suitable electronic assembly 102. In some embodiments, the method 230 may be performed by the computing device 116, or by another computing device.

At 240, AE data may be received. The AE data may include risetime, duration, and absolute energy of an AE waveform 140. In some embodiments, the AE data received at 240 may be the AE waveform 140 itself, while in other embodiments, the AE data received at 240 may include features of an AE waveform 140 previously derived from an AE waveform 140.

At 242, a crack type estimate may be generated based on the rule and the AE data received at 240. As noted above, the rule may take, as its input, the risetime, duration, and absolute energy, and may output an estimate of the type of the crack 150 associated with the input AE data.

Figure 25:
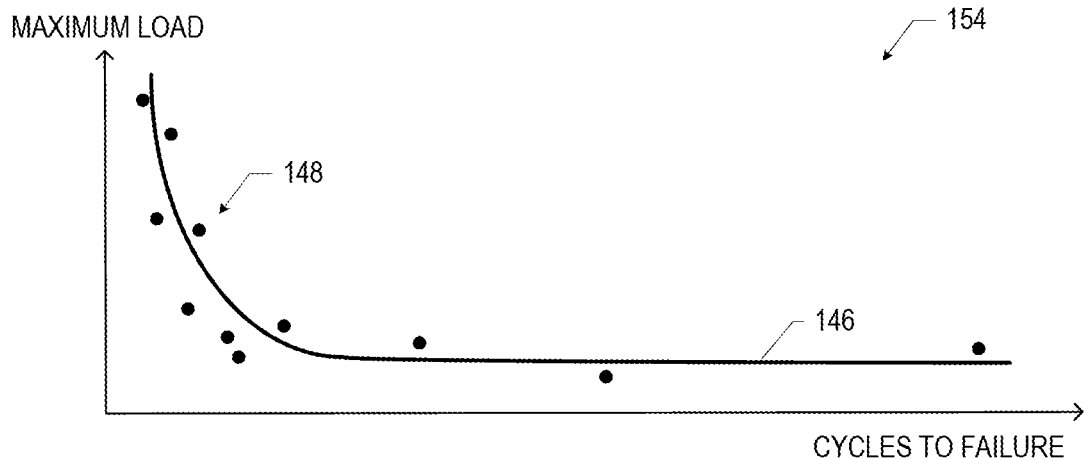
FIG. 25 is an example cyclic lifetime characteristic for an electronic assembly, in accordance with various embodiments.

The mechanical monitoring apparatuses 100 disclosed herein may also be used to provide guidance on the lifetime of an electronic assembly 102 under various load conditions. In particular, by using AE data to detect a mechanical failure (e.g., in accordance with any of the embodiments discussed above with reference to FIG. 15), mechanical failures may be detected more quickly and accurately than using conventional techniques, and thus the conditions under which these failures occur may be identified more precisely. One metric of the mechanical robustness of an electronic assembly 102 is its cyclic lifetime characteristic 154. FIG. 25 is an example cyclic lifetime characteristic 154 for an electronic assembly 102, in accordance with various embodiments. A cyclic lifetime characteristic 154 may represent the number of times a load of a particular magnitude (e.g., applied during attachment of a thermal management device 132) can be applied to and then removed from an electronic assembly 102 before mechanical failure occurs. The greater the magnitude of the load, the fewer cycles an electronic assembly 102 can typically endure before failure. Generating a cyclic lifetime characteristic 154 for an electronic assembly 102 may aid manufacturers and users in determining what kinds of loading conditions the electronic assembly 102 is likely to reliably endure, and when the electronic assembly 102 is likely to reach the end of its life. The cyclic lifetime characteristic 154 may be used to quantify the walking wounded risk of an electronic assembly 102 (i.e., the risk that the mechanical integrity of an electronic assembly 102 has been compromised without that compromise being detected).

Figure 26:
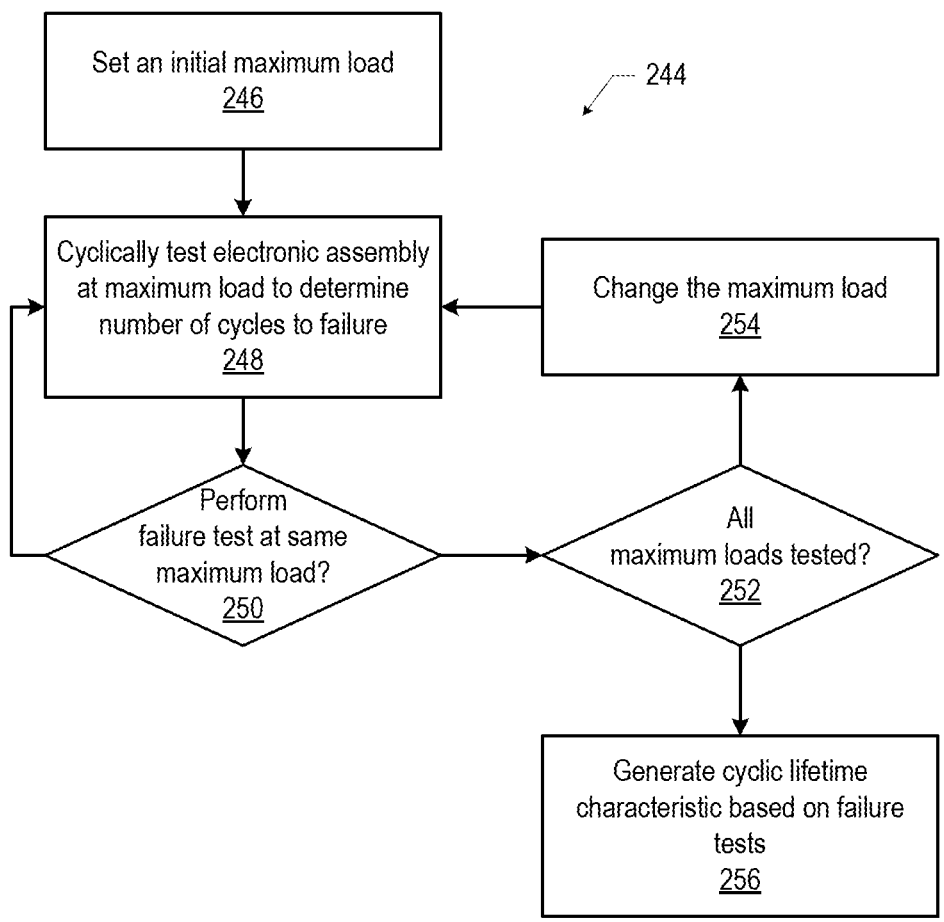
FIG. 26 is a flow diagram of a method of generating a cyclic lifetime characteristic for an electronic assembly, in accordance with various embodiments.

FIG. 26 is a flow diagram of a method 244 of generating a cyclic lifetime characteristic 154 for an electronic assembly 102, in accordance with various embodiments. Although the operations of the method 244 may be illustrated with reference to particular embodiments of the mechanical monitoring apparatuses 100 and electronic assemblies 102 disclosed herein, the method 244 may be used by any suitable apparatus to generate a cyclic lifetime characteristic 154 in any suitable electronic assembly 102. In some embodiments, the method 244 may be performed by the computing device 116 when the computing device 116 controls the operation of the actuator 112. In other embodiments, different computing devices may perform different ones of the operations of the method 244.

At 246, an initial maximum load may be set. For example, the initial maximum load may be set at a given force (e.g., between 50 newtons and 500 newtons for an IC package).

At 248, the electronic assembly may be tested at the maximum load to determine, based on AE data, a number of cycles to failure of the electronic assembly. For example, an electronic assembly 102 may be repeatedly indented, bent, or subject to tensile stress (e.g., as discussed above with reference to a number of the embodiments of the actuators 112) with a load equal to the set maximum load, and AE waveforms 140 generated by the electronic assembly 102 may be monitored to determine how many cycles of such loading are tolerated by the electronic assembly 102 before mechanical failure occurs (e.g., the formation of a crack 150). The detection of a mechanical failure may be based on the AE data (e.g., in accordance with any of the embodiments discussed above with reference to 204 of FIG. 15). The set maximum load and the number of cycles to failure may together provide a point of cyclic load data 148.

At 250, it may be determined whether to perform another round of cyclic failure tests at the same set maximum load. For example, it may be desired to repeat the failure test at a particular maximum load multiple times in order to generate robust data for the cyclic lifetime characteristic 154. If it is determined at 250 that the cyclic failure test is to be repeated at the same set maximum load, the method 244 may return to 248 and another round of testing may be performed at the same maximum load.

If it is determined at 250 that another round of cyclic failure tests is not to be performed, the method 244 may proceed to 252 at which it may be determined whether all maximum loads have already been tested. If it is determined at 252 that there are additional maximum loads to be tested, the method 244 may proceed to 254 at which the maximum load may be changed, and the method may then proceed to 248 to perform another round of testing at the new maximum load. If it is determined at 252 that there are no additional maximum loads to be tested (and therefore no additional cyclic load data 148 to be generated), the method 244 may proceed to 256, at which a cyclic lifetime characteristic may be generated based on the failure tests. In some embodiments, generating a cyclic lifetime characteristic 154 may include fitting a curve 146 to cyclic load data 148.

The apparatuses and techniques disclosed herein may be used to mechanically monitor any suitable electronic assembly. FIGS. 27-31 illustrate various examples of electronic assemblies that may be mechanically monitored using any of the apparatuses and techniques disclosed herein.

Figure 27:
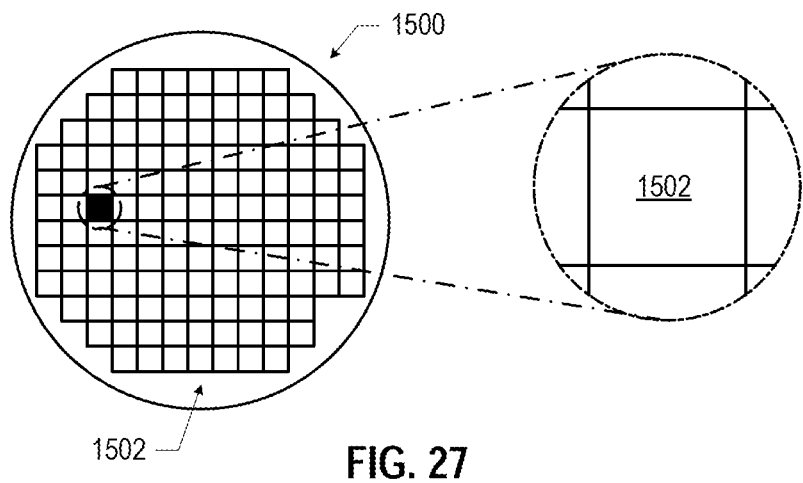
FIG. 27 is a top view of a wafer and dies that may be mechanically monitored in accordance with any of the embodiments disclosed herein.

FIG. 27 is a top view of a wafer 1500 and dies 1502 that may be mechanically monitored in accordance with any of the embodiments disclosed herein. The wafer 1500 may be composed of semiconductor material and may include one or more dies 1502 having IC structures formed on a surface of the wafer 1500. Each of the dies 1502 may be a repeating unit of a semiconductor product that includes any suitable IC. After the fabrication of the semiconductor product is complete, the wafer 1500 may undergo a singulation process in which the dies 1502 are separated from one another to provide discrete "chips" of the semiconductor product. The die 1502 may include one or more transistors (e.g., some of the transistors 1640 of FIG. 28, discussed below) and/or supporting circuitry to route electrical signals to the transistors, as well as any other IC components. In some embodiments, the wafer 1500 or the die 1502 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 1502. For example, a memory array formed by multiple memory devices may be formed on a same die 1502 as a processing device (e.g., the processing device 1802 of FIG. 31) or other logic that is configured to store information in the memory devices or execute instructions stored in the memory array.

Figure 28:
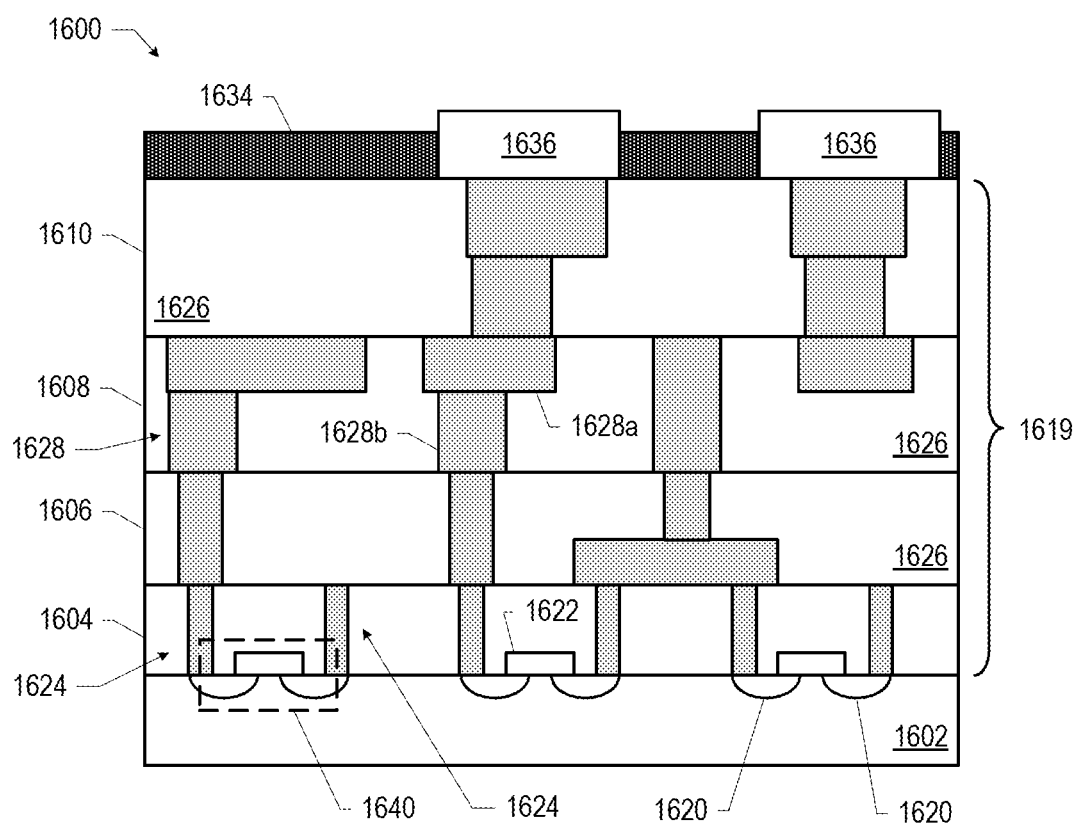
FIG. 28 is a cross-sectional side view of an integrated circuit (IC) device that may be mechanically monitored in accordance with any of the embodiments disclosed herein.

FIG. 28 is a cross-sectional side view of an IC device 1600 that may be mechanically monitored in accordance with any of the embodiments disclosed herein. One or more of the IC devices 1600 may be included in one or more dies 1502 (FIG. 27). The IC device 1600 may be formed on a substrate 1602 (e.g., the wafer 1500 of FIG. 27) and may be included in a die (e.g., the die 1502 of FIG. 27). The substrate 1602 may be a semiconductor substrate composed of semiconductor material systems including, for example, n-type or p-type materials systems (or a combination of both). The substrate 1602 may include, for example, a crystalline substrate formed using a bulk silicon or a silicon-on-insulator (SOI) substructure. In some embodiments, the substrate 1602 may be formed using alternative materials, which may or may not be combined with silicon, that include but are not limited to germanium, indium antimonide, lead telluride, indium arsenide, indium phosphide, gallium arsenide, or gallium antimonide. Further materials classified as group II-VI, III-V, or IV may also be used to form the substrate 1602. Although a few examples of materials from which the substrate 1602 may be formed are described here, any material that may serve as a foundation for an IC device 1600 may be used. The substrate 1602 may be part of a singulated die (e.g., the dies 1502 of FIG. 27) or a wafer (e.g., the wafer 1500 of FIG. 27).

The IC device 1600 may include one or more device layers 1604 disposed on the substrate 1602. The device layer 1604 may include features of one or more transistors 1640 (e.g., metal oxide semiconductor field-effect transistors (MOSFETs)) formed on the substrate 1602. The device layer 1604 may include, for example, one or more source and/or drain (S/D) regions 1620, a gate 1622 to control current flow in the transistors 1640 between the S/D regions 1620, and one or more S/D contacts 1624 to route electrical signals to/from the S/D regions 1620. The transistors 1640 may include additional features not depicted for the sake of clarity, such as device isolation regions, gate contacts, and the like. The transistors 1640 are not limited to the type and configuration depicted in FIG. 28 and may include a wide variety of other types and configurations such as, for example, planar transistors, non-planar transistors, or a combination of both. Non-planar transistors may include FinFET transistors, such as double-gate transistors or tri-gate transistors, and wrap-around or all-around gate transistors, such as nanoribbon and nanowire transistors.

Each transistor 1640 may include a gate 1622 formed of at least two layers, a gate dielectric and a gate electrode. The gate dielectric may include one layer or a stack of layers. The one or more layers may include silicon oxide, silicon dioxide, silicon carbide, and/or a high-k dielectric material. The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric to improve its quality when a high-k material is used.

The gate electrode may be formed on the gate dielectric and may include at least one p-type work function metal or n-type work function metal, depending on whether the transistor 1640 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer. For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some embodiments, when viewed as a cross-section of the transistor 1640 along the source-channel-drain direction, the gate electrode may consist of a U-shaped structure that includes a bottom portion substantially parallel to the surface of the substrate and two sidewall portions that are substantially perpendicular to the top surface of the substrate. In other embodiments, at least one of the metal layers that form the gate electrode may simply be a planar layer that is substantially parallel to the top surface of the substrate and does not include sidewall portions substantially perpendicular to the top surface of the substrate. In other embodiments, the gate electrode may consist of a combination of U-shaped structures and planar, non-U-shaped structures. For example, the gate electrode may consist of one or more U-shaped metal layers formed atop one or more planar, non-U-shaped layers.

In some embodiments, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some embodiments, a plurality of spacer pairs may be used; for instance, two pairs, three pairs, or four pairs of sidewall spacers may be formed on opposing sides of the gate stack.

The S/D regions 1620 may be formed within the substrate 1602 adjacent to the gate 1622 of each transistor 1640. The S/D regions 1620 may be formed using an implantation/diffusion process or an etching/deposition process, for example. In the former process, dopants such as boron, aluminum, antimony, phosphorous, or arsenic may be ion-implanted into the substrate 1602 to form the S/D regions 1620. An annealing process that activates the dopants and causes them to diffuse farther into the substrate 1602 may follow the ion-implantation process. In the latter process, the substrate 1602 may first be etched to form recesses at the locations of the S/D regions 1620. An epitaxial deposition process may then be carried out to fill the recesses with material that is used to fabricate the S/D regions 1620. In some implementations, the S/D regions 1620 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 1620 may be formed using one or more alternate semiconductor materials such as germanium or a group III-V material or alloy. In further embodiments, one or more layers of metal and/or metal alloys may be used to form the S/D regions 1620.

Electrical signals, such as power and/or input/output (I/O) signals, may be routed to and/or from the devices (e.g., transistors 1640) of the device layer 1604 through one or more interconnect layers disposed on the device layer 1604 (illustrated in FIG. 28 as interconnect layers 1606-1610). For example, electrically conductive features of the device layer 1604 (e.g., the gate 1622 and the S/D contacts 1624) may be electrically coupled with the interconnect structures 1628 of the interconnect layers 1606-1610. The one or more interconnect layers 1606-1610 may form a metallization stack (also referred to as an "ILD stack") 1619 of the IC device 1600.

The interconnect structures 1628 may be arranged within the interconnect layers 1606-1610 to route electrical signals according to a wide variety of designs (in particular, the arrangement is not limited to the particular configuration of interconnect structures 1628 depicted in FIG. 28). Although a particular number of interconnect layers 1606-1610 is depicted in FIG. 28, embodiments of the present disclosure include IC devices having more or fewer interconnect layers than depicted.

In some embodiments, the interconnect structures 1628 may include lines 1628a and/or vias 1628b filled with an electrically conductive material such as a metal. The lines 1628a may be arranged to route electrical signals in a direction of a plane that is substantially parallel with a surface of the substrate 1602 upon which the device layer 1604 is formed. For example, the lines 1628a may route electrical signals in a direction in and out of the page from the perspective of FIG. 28. The vias 1628b may be arranged to route electrical signals in a direction of a plane that is substantially perpendicular to the surface of the substrate 1602 upon which the device layer 1604 is formed. In some embodiments, the vias 1628b may electrically couple lines 1628a of different interconnect layers 1606-1610 together.

The interconnect layers 1606-1610 may include a dielectric material 1626 disposed between the interconnect structures 1628, as shown in FIG. 28. In some embodiments, the dielectric material 1626 disposed between the interconnect structures 1628 in different ones of the interconnect layers 1606-1610 may have different compositions; in other embodiments, the composition of the dielectric material 1626 between different interconnect layers 1606-1610 may be the same.

A first interconnect layer 1606 (referred to as Metal 1 or "M1") may be formed directly on the device layer 1604. In some embodiments, the first interconnect layer 1606 may include lines 1628a and/or vias 1628b, as shown. The lines 1628a of the first interconnect layer 1606 may be coupled with contacts (e.g., the S/D contacts 1624) of the device layer 1604.

A second interconnect layer 1608 (referred to as Metal 2 or "M2") may be formed directly on the first interconnect layer 1606. In some embodiments, the second interconnect layer 1608 may include vias 1628b to couple the lines 1628a of the second interconnect layer 1608 with the lines 1628a of the first interconnect layer 1606. Although the lines 1628a and the vias 1628b are structurally delineated with a line within each interconnect layer (e.g., within the second interconnect layer 1608) for the sake of clarity, the lines 1628a and the vias 1628b may be structurally and/or materially contiguous (e.g., simultaneously filled during a dual-damascene process) in some embodiments.

A third interconnect layer 1610 (referred to as Metal 3 or "M3") (and additional interconnect layers, as desired) may be formed in succession on the second interconnect layer 1608 according to similar techniques and configurations described in connection with the second interconnect layer 1608 or the first interconnect layer 1606. In some embodiments, the interconnect layers that are "higher up" in the metallization stack 1619 in the IC device 1600 (i.e., farther away from the device layer 1604) may be thicker.

The IC device 1600 may include a solder resist material 1634 (e.g., polyimide or similar material) and one or more conductive contacts 1636 formed on the interconnect layers 1606-1610. In FIG. 28, the conductive contacts 1636 are illustrated as taking the form of bond pads. The conductive contacts 1636 may be electrically coupled with the interconnect structures 1628 and configured to route the electrical signals of the transistor(s) 1640 to other external devices. For example, solder bonds may be formed on the one or more conductive contacts 1636 to mechanically and/or electrically couple a chip including the IC device 1600 with another component (e.g., a circuit board). The IC device 1600 may include additional or alternate structures to route the electrical signals from the interconnect layers 1606-1610; for example, the conductive contacts 1636 may include other analogous features (e.g., posts) that route the electrical signals to external components.

Figure 29:
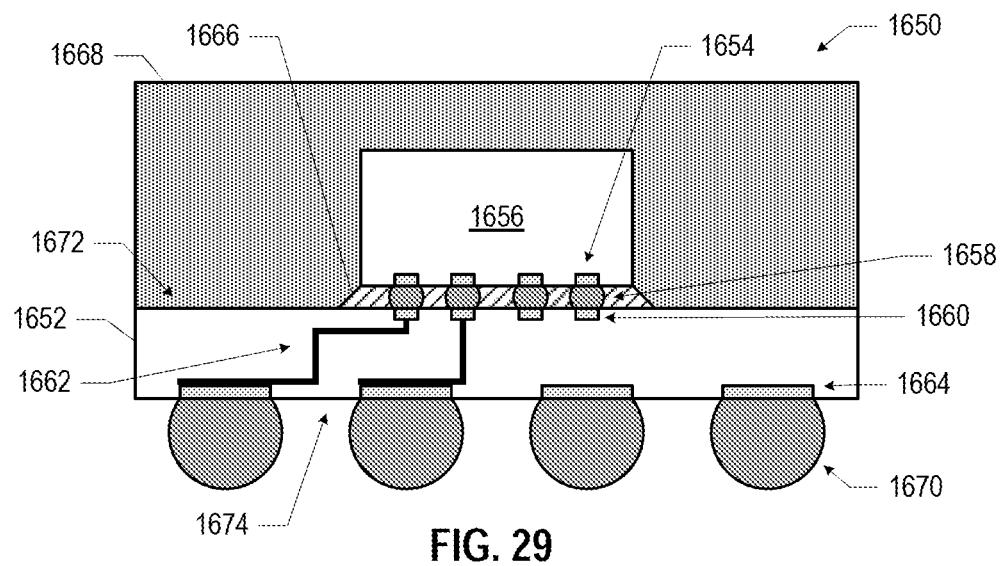
FIG. 29 is a cross-sectional side view of an IC package that may be mechanically monitored in accordance with various embodiments.

FIG. 29 is a cross-sectional view of an example IC package 1650 that may be mechanically monitored in accordance with any of the embodiments disclosed herein. The package substrate 1652 may be formed of a dielectric material, and may have conductive pathways extending through the dielectric material between the face 1672 and the face 1674, or between different locations on the face 1672, and/or between different locations on the face 1674. These conductive pathways may take the form of any of the interconnects 1628 discussed above with reference to FIG. 28.

The IC package 1650 may include a die 1656 coupled to the package substrate 1652 via conductive contacts 1654 of the die 1656, first-level interconnects 1658, and conductive contacts 1660 of the package substrate 1652. The conductive contacts 1660 may be coupled to conductive pathways 1662 through the package substrate 1652, allowing circuitry within the die 1656 to electrically couple to various ones of the conductive contacts 1664 (or to other devices included in the package substrate 1652, not shown). The first-level interconnects 1658 illustrated in FIG. 29 are solder bumps, but any suitable first-level interconnects 1658 may be used. As used herein, a "conductive contact" may refer to a portion of conductive material (e.g., metal) serving as an electrical interface between different components; conductive contacts may be recessed in, flush with, or extending away from a surface of a component, and may take any suitable form (e.g., a conductive pad or socket).

In some embodiments, an underfill material 1666 may be disposed between the die 1656 and the package substrate 1652 around the first-level interconnects 1658, and a mold compound 1668 may be disposed around the die 1656 and in contact with the package substrate 1652. In some embodiments, the underfill material 1666 may be the same as the mold compound 1668. Example materials that may be used for the underfill material 1666 and the mold compound 1668 are epoxy mold materials, as suitable. Second-level interconnects 1670 may be coupled to the conductive contacts 1664. The second-level interconnects 1670 illustrated in FIG. 29 are solder balls (e.g., for a ball grid array arrangement), but any suitable second-level interconnects 16770 may be used (e.g., pins in a pin grid array arrangement or lands in a land grid array arrangement). The second-level interconnects 1670 may be used to couple the IC package 1650 to another component, such as a circuit board (e.g., a motherboard), an interposer, or another IC package, as known in the art and as discussed below with reference to FIG. 30.

Although the IC package 1650 illustrated in FIG. 29 is a flip chip package, other package architectures may be used. For example, the IC package 1650 may be a ball grid array (BGA) package, such as an embedded wafer-level ball grid array (eWLB) package. In another example, the IC package 1650 may be a wafer-level chip scale package (WLCSP) or a panel fanout (FO) package. Although a single die 1656 is illustrated in the IC package 1650 of FIG. 29, an IC package 1650 may include multiple dies 1656. An IC package 1650 may include additional passive components, such as surface-mount resistors, capacitors, and inductors disposed on the first face 1672 or the second face 1674 of the package substrate 1652. More generally, an IC package 1650 may include any other active or passive components known in the art.

Figure 30:
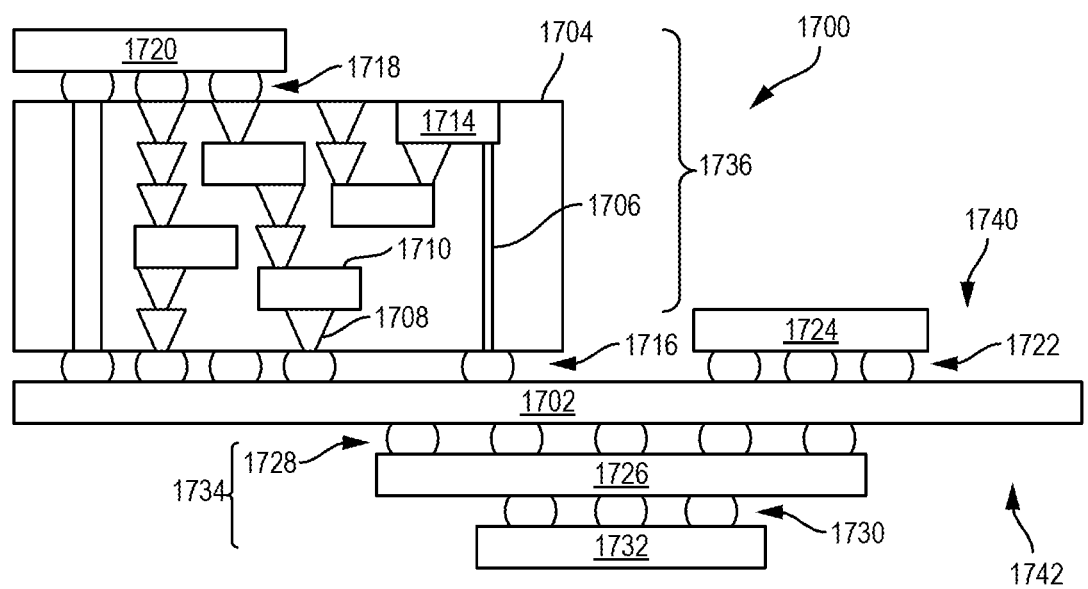
FIG. 30 is a cross-sectional side view of an IC device assembly that may be mechanically monitored in accordance with any of the embodiments disclosed herein.

FIG. 30 is a cross-sectional side view of an IC device assembly 1700 that may be mechanically monitored in accordance with any of the embodiments disclosed herein. The IC device assembly 1700 includes a number of components disposed on a circuit board 1702 (which may be, e.g., a motherboard). The IC device assembly 1700 includes components disposed on a first face 1740 of the circuit board 1702 and an opposing second face 1742 of the circuit board 1702; generally, components may be disposed on one or both faces 1740 and 1742. Any of the IC packages discussed below with reference to the IC device assembly 1700 may take the form of any of the embodiments of the IC package 1650 discussed above with reference to FIG. 29.

In some embodiments, the circuit board 1702 may be a PCB including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 1702. In other embodiments, the circuit board 1702 may be a non-PCB substrate.

The IC device assembly 1700 illustrated in FIG. 30 includes a package-on-interposer structure 1736 coupled to the first face 1740 of the circuit board 1702 by coupling components 1716. The coupling components 1716 may electrically and mechanically couple the package-on-interposer structure 1736 to the circuit board 1702, and may include solder balls (as shown in FIG. 30), male and female portions of a socket, an adhesive, an underfill material, and/or any other suitable electrical and/or mechanical coupling structure.

The package-on-interposer structure 1736 may include an IC package 1720 coupled to an interposer 1704 by coupling components 1718. The coupling components 1718 may take any suitable form for the application, such as the forms discussed above with reference to the coupling components 1716. Although a single IC package 1720 is shown in FIG. 30, multiple IC packages may be coupled to the interposer 1704; indeed, additional interposers may be coupled to the interposer 1704. The interposer 1704 may provide an intervening substrate used to bridge the circuit board 1702 and the IC package 1720. The IC package 1720 may be or include, for example, a die (the die 1502 of FIG. 27), an IC device (e.g., the IC device 1600 of FIG. 28), or any other suitable component. Generally, the interposer 1704 may spread a connection to a wider pitch or reroute a connection to a different connection. For example, the interposer 1704 may couple the IC package 1720 (e.g., a die) to a set of BGA conductive contacts of the coupling components 1716 for coupling to the circuit board 1702. In the embodiment illustrated in FIG. 30, the IC package 1720 and the circuit board 1702 are attached to opposing sides of the interposer 1704; in other embodiments, the IC package 1720 and the circuit board 1702 may be attached to a same side of the interposer 1704. In some embodiments, three or more components may be interconnected by way of the interposer 1704.

In some embodiments, the interposer 1704 may be formed as a PCB, including multiple metal layers separated from one another by layers of dielectric material and interconnected by electrically conductive vias. In some embodiments, the interposer 1704 may be formed of an epoxy resin, a fiberglass-reinforced epoxy resin, an epoxy resin with inorganic fillers, a ceramic material, or a polymer material such as polyimide. In some embodiments, the interposer 1704 may be formed of alternate rigid or flexible materials that may include the same materials described above for use in a semiconductor substrate, such as silicon, germanium, and other group III-V and group IV materials. The interposer 1704 may include metal interconnects 1708 and vias 1710, including but not limited to through-silicon vias (TSVs) 1706. The interposer 1704 may further include embedded devices 1714, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 1704. The package-on-interposer structure 1736 may take the form of any of the package-on-interposer structures known in the art.

The IC device assembly 1700 may include an IC package 1724 coupled to the first face 1740 of the circuit board 1702 by coupling components 1722. The coupling components 1722 may take the form of any of the embodiments discussed above with reference to the coupling components 1716, and the IC package 1724 may take the form of any of the embodiments discussed above with reference to the IC package 1720.

The IC device assembly 1700 illustrated in FIG. 30 includes a package-on-package structure 1734 coupled to the second face 1742 of the circuit board 1702 by coupling components 1728. The package-on-package structure 1734 may include an IC package 1726 and an IC package 1732 coupled together by coupling components 1730 such that the IC package 1726 is disposed between the circuit board 1702 and the IC package 1732. The coupling components 1728 and 1730 may take the form of any of the embodiments of the coupling components 1716 discussed above, and the IC packages 1726 and 1732 may take the form of any of the embodiments of the IC package 1720 discussed above. The package-on-package structure 1734 may be configured in accordance with any of the package-on-package structures known in the art.

Figure 31:
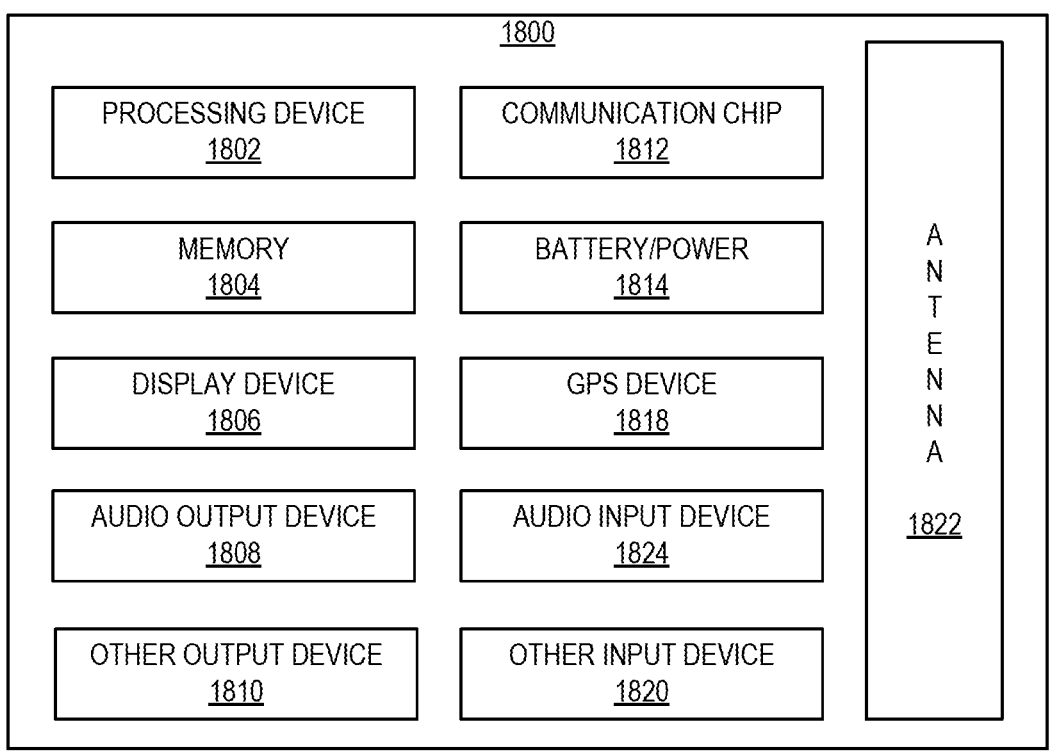
FIG. 31 is a block diagram of an example electrical device that may be mechanically monitored in accordance with any of the embodiments disclosed herein.

FIG. 31 is a block diagram of an example electrical device 1800 that may be mechanically monitored in accordance with any of the embodiments disclosed herein. Any suitable ones of the components of the electrical device 1800 may include one or more of the IC packages 1650, IC devices 1600, or dies 1502 disclosed herein. A number of components are illustrated in FIG. 31 as included in the electrical device 1800, but any one or more of these components may be omitted or duplicated, as suitable for the application. In some embodiments, some or all of the components included in the electrical device 1800 may be attached to one or more motherboards. In some embodiments, some or all of these components are fabricated onto a single system-on-a-chip (SoC) die.

Additionally, in various embodiments, the electrical device 1800 may not include one or more of the components illustrated in FIG. 31, but the electrical device 1800 may include interface circuitry for coupling to the one or more components. For example, the electrical device 1800 may not include a display device 1806, but may include display device interface circuitry (e.g., a connector and driver circuitry) to which a display device 1806 may be coupled. In another set of examples, the electrical device 1800 may not include an audio input device 1824 or an audio output device 1808, but may include audio input or output device interface circuitry (e.g., connectors and supporting circuitry) to which an audio input device 1824 or audio output device 1808 may be coupled.

The electrical device 1800 may include a processing device 1802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices. The electrical device 1800 may include a memory 1804, which may itself include one or more memory devices such as volatile memory (e.g., dynamic random access memory (DRAM)), nonvolatile memory (e.g., read-only memory (ROM)), flash memory, solid state memory, and/or a hard drive. In some embodiments, the memory 1804 may include memory that shares a die with the processing device 1802. This memory may be used as cache memory and may include embedded dynamic random access memory (eDRAM) or spin transfer torque magnetic random access memory (STT-MRAM).

In some embodiments, the electrical device 1800 may include a communication chip 1812 (e.g., one or more communication chips). For example, the communication chip 1812 may be configured for managing wireless communications for the transfer of data to and from the electrical device 1800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1812 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1812 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1812 may operate in accordance with other wireless protocols in other embodiments. The electrical device 1800 may include an antenna 1822 to facilitate wireless communications and/or to receive other wireless communications (such as AM or FM radio transmissions).

In some embodiments, the communication chip 1812 may manage wired communications, such as electrical, optical, or any other suitable communication protocols (e.g., the Ethernet). As noted above, the communication chip 1812 may include multiple communication chips. For instance, a first communication chip 1812 may be dedicated to shorter-range wireless communications such as Wi-Fi or Bluetooth, and a second communication chip 1812 may be dedicated to longer-range wireless communications such as global positioning system (GPS), EDGE, GPRS, CDMA, WiMAX, LTE, EV-DO, or others. In some embodiments, a first communication chip 1812 may be dedicated to wireless communications, and a second communication chip 1812 may be dedicated to wired communications.

The electrical device 1800 may include battery/power circuitry 1814. The battery/power circuitry 1814 may include one or more energy storage devices (e.g., batteries or capacitors) and/or circuitry for coupling components of the electrical device 1800 to an energy source separate from the electrical device 1800 (e.g., AC line power).

The electrical device 1800 may include a display device 1806 (or corresponding interface circuitry, as discussed above). The display device 1806 may include any visual indicators, such as a heads-up display, a computer monitor, a projector, a touchscreen display, a liquid crystal display (LCD), a light-emitting diode display, or a flat panel display.

The electrical device 1800 may include an audio output device 1808 (or corresponding interface circuitry, as discussed above). The audio output device 1808 may include any device that generates an audible indicator, such as speakers, headsets, or earbuds.

The electrical device 1800 may include an audio input device 1824 (or corresponding interface circuitry, as discussed above). The audio input device 1824 may include any device that generates a signal representative of a sound, such as microphones, microphone arrays, or digital instruments (e.g., instruments having a musical instrument digital interface (MIDI) output).

The electrical device 1800 may include a GPS device 1818 (or corresponding interface circuitry, as discussed above). The GPS device 1818 may be in communication with a satellite-based system and may receive a location of the electrical device 1800, as known in the art.

The electrical device 1800 may include an other output device 1810 (or corresponding interface circuitry, as discussed above). Examples of the other output device 1810 may include an audio codec, a video codec, a printer, a wired or wireless transmitter for providing information to other devices, or an additional storage device.

The electrical device 1800 may include an other input device 1820 (or corresponding interface circuitry, as discussed above). Examples of the other input device 1820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 1800 may have any desired form factor, such as a handheld or mobile electrical device (e.g., a cell phone, a smart phone, a mobile internet device, a music player, a tablet computer, a laptop computer, a netbook computer, an ultrabook computer, a personal digital assistant (PDA), an ultra mobile personal computer, etc.), a desktop electrical device, a server or other networked computing component, a printer, a scanner, a monitor, a set-top box, an entertainment control unit, a vehicle control unit, a digital camera, a digital video recorder, or a wearable electrical device. In some embodiments, the electrical device 1800 may be any other electronic device that processes data.

The following paragraphs provide various examples of the embodiments disclosed herein.

Example 1 is a mechanical monitoring apparatus, including: a fixture to receive an electronic assembly; an acoustic sensor; and a computing device communicatively coupled to the acoustic sensor, wherein the acoustic sensor is to detect an acoustic emission waveform generated by a mechanical failure of the electronic assembly during testing.

Example 2 may include the subject matter of Example 1, and may further specify that the fixture includes an indenter.

Example 3 may include the subject matter of Example 1, and may further specify that the fixture includes a tensile tester.

Example 4 may include the subject matter of Example 1, and may further specify that the fixture includes a bend tester.

Example 5 may include the subject matter of Example 1, and may further specify that the fixture includes a pick-and-place machine.

Example 6 may include the subject matter of Example 1, and may further specify that the fixture includes a thermal head.

Example 7 may include the subject matter of Example 1, and may further specify that the fixture includes an edge loader.

Example 8 may include the subject matter of any of Examples 1-7, and may further specify that the acoustic sensor is coupled to the fixture.

Example 9 may include the subject matter of Example 8, and may further specify that the acoustic sensor is on a support of the fixture.

Example 10 may include the subject matter of any of Examples 8-9, and may further specify that the acoustic sensor is coupled to the fixture by a viscous adhesive.

Example 11 may include the subject matter of any of Examples 1-10, and may further include: the electronic assembly.

Example 12 may include the subject matter of Example 11, and may further specify that the acoustic sensor is coupled to the electronic assembly.

Example 13 may include the subject matter of Example 12, and may further specify that the acoustic sensor is coupled to the electronic assembly by a viscous adhesive.

Example 14 may include the subject matter of any of Examples 1-13, and may further specify that the acoustic sensor includes a piezoelectric crystal.

Example 15 may include the subject matter of any of Examples 1-14, and may further specify that the electronic assembly includes an integrated circuit (IC) package.

Example 16 may include the subject matter of any of Examples 1-15, and may further specify that the electronic assembly includes a circuit board.

Example 17 may include the subject matter of any of Examples 1-16, and may further specify that the computing device is to cause testing to stop when a mechanical failure of the electronic assembly is detected.

Example 18 may include the subject matter of any of Examples 1-17, and may further specify that the mechanical failure is a crack.

Example 19 may include the subject matter of Example 18, and may further specify that the computing device is to estimate a crack type of the crack based at least in part on the acoustic emission waveform.

Example 20 may include the subject matter of any of Examples 18-19, and may further specify that the computing device is to estimate a crack length of the crack based at least in part on the acoustic emission waveform.

Example 21 may include the subject matter of any of Examples 1-20, and may further specify that the acoustic sensor is one of a plurality of acoustic sensors included in the mechanical monitoring apparatus, and individual ones of the acoustic sensors are coupled to the computing device.

Example 22 may include the subject matter of Example 21, and may further specify that the computing device is to estimate a failure onset location of the mechanical failure based at least in part on acoustic emission waveforms generated by multiple ones of the acoustic sensors.

Example 23 may include the subject matter of any of Examples 1-22, and may further specify that the fixture includes magnetic bumpers to secure the electronic assembly.

Example 24 is one or more non-transitory computer readable media having instructions thereon that, upon execution by one or more processing devices of a mechanical monitoring apparatus, cause the mechanical monitoring apparatus to: receive data representative of acoustic emission waveforms generated by mechanical failures of integrated circuit (IC) packages; receive data representative of physical features of the mechanical failures; generate physical feature estimation criteria based on the data representative of the acoustic emission waveforms and the data representative of the physical features; receive additional data representative of an additional acoustic emission waveform generated by an additional mechanical failure of an electronic assembly; and generate an estimate of a physical feature of the additional mechanical failure based at least in part on the additional data and the physical feature estimation criteria.

Example 25 may include the subject matter of Example 24, and may further specify that the physical feature includes a crack type.

Example 26 may include the subject matter of any of Examples 24-25, and may further specify that the physical feature includes a crack length.

Example 27 may include the subject matter of any of Examples 24-26, and may further specify that generate the physical feature estimation criteria includes perform a machine learning technique on the data representative of the acoustic emission waveforms and the data representative of physical features.

Example 28 may include the subject matter of Example 27, and may further specify that the machine learning technique includes a regression analysis.

Example 29 may include the subject matter of any of Examples 27-28, and may further specify that the machine learning technique includes a clustering analysis.

Example 30 may include the subject matter of any of Examples 24-29, and may further specify that the acoustic emission waveforms are generated by a single acoustic sensor.

Example 31 may include the subject matter of any of Examples 24-29, and may further specify that the acoustic emission waveforms are generated by multiple acoustic sensors.

Example 32 is a method of testing an electronic assembly, including: receiving data from an acoustic sensor in acoustic communication with the electronic assembly during application of mechanical stress to the electronic assembly; and identifying a characteristic of a mechanical failure of the electronic assembly in the data received from the acoustic sensor.

Example 33 may include the subject matter of Example 32, and may further specify that the acoustic sensor is one of a plurality of acoustic sensors in acoustic communication with the electronic assembly during application of mechanical stress to the electronic assembly, and identifying the characteristic of the mechanical failure includes estimating a failure onset location of the mechanical failure based on the data generated by the plurality of acoustic sensors.

Example 34 may include the subject matter of any of Examples 32-33, and may further include: causing the application of mechanical stress to stop upon detection of the characteristic of the mechanical failure.

Example 35 may include the subject matter of any of Examples 32-34, and may further specify that the mechanical failure is a crack.

Example 36 may include the subject matter of Example 35, and may further specify that identifying the characteristic of the mechanical failure includes estimating a crack type of the crack.

Example 37 may include the subject matter of any of Examples 35-36, and may further specify that identifying the characteristic of the mechanical failure includes estimating a crack length of the crack.

Example 38 may include the subject matter of any of Examples 32-37, and may further specify that the mechanical stress is applied during mechanical testing of the electronic assembly.

Example 39 may include the subject matter of Example 38, and may further specify that the mechanical stress is applied during tensile testing of the electronic assembly.

Example 40 may include the subject matter of Example 38, and may further specify that the mechanical stress is applied during load testing of the electronic assembly.

Example 41 may include the subject matter of any of Examples 32-40, and may further specify that the mechanical stress is applied during class testing of the electronic assembly.

Example 42 may include the subject matter of any of Examples 32-40, and may further specify that the mechanical stress is applied during a pick-and-place operation.

Example 43 may include the subject matter of any of Examples 32-42, and may further specify that the acoustic sensor is on the electronic assembly.

Example 44 may include the subject matter of any of Examples 32-42, and may further specify that the acoustic sensor is not on the electronic assembly.

Example 45 may include the subject matter of any of Examples 32-44, and may further specify that the electronic assembly is a flexible integrated circuit package.

Example 46 is one or more non-transitory computer readable media having instructions thereon that, upon execution by one or more processing devices of a mechanical monitoring apparatus, cause the mechanical monitoring apparatus to: receive data representative of an acoustic emission waveform generated by a mechanical failure of an electronic assembly; and generate an estimate of a physical feature of the mechanical failure based at least in part on the data, wherein the physical feature includes a crack type, crack length, or failure onset location.

Example 47 may include the subject matter of Example 46, and may further specify that the physical feature includes a crack type.

Example 48 may include the subject matter of Example 47, and may further specify that the data includes a duration, a rise time, and an absolute energy.

Example 49 may include the subject matter of any of Examples 46-48, and may further specify that the physical feature includes a crack length.

Example 50 may include the subject matter of Example 49, and may further specify that the data includes a duration, a rise time, and an absolute energy.

Example 51 may include the subject matter of Example 50, and may further specify that the data further includes an amplitude and counts.

Example 52 may include the subject matter of any of Examples 46-51, and may further specify that the physical feature includes a failure onset location.

Example 53 may include the subject matter of Example 52, and may further specify that the data is generated by multiple acoustic sensors.

The invention claimed is:

1. A mechanical monitoring apparatus, comprising:
   an actuator configured to apply force on an electronic assembly under test;
   a fixture to receive the electronic assembly;
   an acoustic sensor; and
   a computing device communicatively coupled to the acoustic sensor, wherein:
   the electronic assembly comprises:
      an integrated circuit (IC) package having a die therein,
      a thermal management device attached to the IC package on one side and a circuit board attached to the IC package on an opposing side,
      the thermal management device includes leaf springs securable to the circuit board with screws at three of four locations,
      the actuator applies force on a fourth one of the four locations during testing, and
      the acoustic sensor is configured to detect an acoustic emission waveform generated by a mechanical failure of the electronic assembly during testing.

2. The mechanical monitoring apparatus of claim 1, wherein the fixture includes an indenter.

3. The mechanical monitoring apparatus of claim 1, wherein the fixture includes a pick-and-place machine.

4. The mechanical monitoring apparatus of claim 1, wherein the fixture includes a thermal head.

5. The mechanical monitoring apparatus of claim 1, wherein the acoustic sensor is coupled to the fixture.

6. The mechanical monitoring apparatus of claim 1, wherein the acoustic sensor includes a piezoelectric crystal.

7. The mechanical monitoring apparatus of claim 1, wherein the electronic assembly further includes a circuit board.

8. The mechanical monitoring apparatus of claim 1, wherein the mechanical failure is a crack.

9. The mechanical monitoring apparatus of claim 8, wherein the computing device is to estimate a crack type of the crack based at least in part on the acoustic emission waveform.

10. The mechanical monitoring apparatus of claim 8, wherein the computing device is to estimate a crack length of the crack based at least in part on the acoustic emission waveform.

11. The mechanical monitoring apparatus of claim 1, wherein the acoustic sensor is one of a plurality of acoustic sensors included in the mechanical monitoring apparatus, and individual ones of the acoustic sensors are coupled to the computing device.

12. The mechanical monitoring apparatus of claim 11, wherein the computing device is to estimate a failure onset location of the mechanical failure based at least in part on acoustic emission waveforms generated by multiple ones of the acoustic sensors.

13. One or more non-transitory computer readable media having instructions thereon that, upon execution by one or more processing devices of a mechanical monitoring apparatus, cause the mechanical monitoring apparatus to:
receive data representative of acoustic emission waveforms generated by mechanical failures of integrated circuit (IC) packages having one or more dies therein, wherein:
a thermal management device is attached to at least one IC package on one side and a circuit board is attached to the at least one IC package on an opposing side,
the thermal management device includes leaf springs securable to the circuit board with screws at three of four locations, and
the mechanical monitoring apparatus is coupled to an actuator that applies force on a fourth one of the four locations during testing;
receive data representative of physical features of the mechanical failures from the testing;
generate physical feature estimation criteria based on the data representative of the acoustic emission waveforms and the data representative of the physical features;
receive additional data representative of an additional acoustic emission waveform generated by an additional mechanical failure of the at least one IC package; and
generate an estimate of a physical feature of the additional mechanical failure based at least in part on the additional data and the physical feature estimation criteria.

14. The one or more non-transitory computer readable media of claim 13, wherein generate the physical feature estimation criteria includes perform a machine learning technique on the data representative of the acoustic emission waveforms and the data representative of physical features.

15. The one or more non-transitory computer readable media of claim 14, wherein the machine learning technique includes a regression analysis or a clustering analysis.

16. A method of testing an electronic assembly, comprising:
receiving data from an acoustic sensor in acoustic communication with the electronic assembly during application of mechanical stress to the electronic assembly, wherein:
the electronic assembly comprises:
an IC package having a die therein; and
a thermal management device attached to the IC package on one side and a circuit board attached to the IC package on an opposing side, the thermal management device including leaf springs securable to the circuit board with screws at three of four locations, and
the mechanical stress is applied on a fourth one of the four locations; and
identifying a characteristic of a mechanical failure of the electronic assembly in the data received from the acoustic sensor.

17. The method of claim 16, wherein the acoustic sensor is one of a plurality of acoustic sensors in acoustic communication with the electronic assembly during application of mechanical stress to the electronic assembly, and identifying the characteristic of the mechanical failure includes estimating a failure onset location of the mechanical failure based on the data generated by the plurality of acoustic sensors.

18. The method of claim 16, further comprising:
causing the application of mechanical stress to stop upon detection of the characteristic of the mechanical failure.

19. One or more non-transitory computer readable media having instructions thereon that, upon execution by one or more processing devices of a mechanical monitoring apparatus, cause the mechanical monitoring apparatus to:
receive data representative of an acoustic emission waveform generated during a test by a mechanical failure of an electronic assembly having an IC package with a die therein, wherein the electronic assembly further comprises a thermal management device attached to the IC package on one side and a circuit board attached to the IC package on an opposing side,
the thermal management device includes leaf springs securable to the circuit board with screws at three of four locations,
the monitoring apparatus is coupled to an actuator that applies force on a fourth one of the four locations during the test; and
generate an estimate of a physical feature of the mechanical failure based at least in part on the data, wherein the physical feature includes a crack type, crack length, or failure onset location.

20. The one or more non-transitory computer readable media of claim 19, wherein the physical feature includes a crack type.

21. The one or more non-transitory computer readable media of claim 20, wherein the data includes a duration, a rise time, and an absolute energy.

22. The one or more non-transitory computer readable media of claim 19, wherein the physical feature includes a crack length.

23. The one or more non-transitory computer readable media of claim 22, wherein the data includes a duration, a rise time, and an absolute energy.

24. The one or more non-transitory computer readable media of claim 23, wherein the data further includes an amplitude and counts.

25. The one or more non-transitory computer readable media of claim 19, wherein the physical feature includes a failure onset location.

* * * * *